(12) United States Patent
Shirai et al.

(10) Patent No.: US 10,035,213 B2
(45) Date of Patent: Jul. 31, 2018

(54) WELDING METHOD AND WELDING APPARATUS

(75) Inventors: Hideaki Shirai, Anjo (JP); Tsuyoshi Hayakawa, Hekinan (JP)

(73) Assignee: DENSO CORPORATION, Kariya (JP)

( * ) Notice: Subject to any disclaimer, the term of this patent is extended or adjusted under 35 U.S.C. 154(b) by 1033 days.

(21) Appl. No.: 13/353,841

(22) Filed: Jan. 19, 2012

(65) Prior Publication Data

US 2012/0187094 A1    Jul. 26, 2012

(30) Foreign Application Priority Data

Jan. 26, 2011  (JP) .................... 2011-014107
Oct. 4, 2011   (JP) .................... 2011-220065

(51) Int. Cl.
*B23K 9/16*   (2006.01)
*B23K 9/167*  (2006.01)
*B23K 9/29*   (2006.01)

(52) U.S. Cl.
CPC .............. *B23K 9/164* (2013.01); *B23K 9/167* (2013.01); *B23K 9/296* (2013.01)

(58) Field of Classification Search
CPC .... B23K 9/16; B23K 15/0046; B23K 10/006; B23K 9/167; B23K 9/164; B23K 9/296
See application file for complete search history.

(56) References Cited

U.S. PATENT DOCUMENTS

| | | | |
|---|---|---|---|
| 2,590,084 A * | 3/1952 | Bernard | 219/75 |
| 2,694,763 A * | 11/1954 | Muller | 219/74 |
| 2,694,764 A * | 11/1954 | Muller | 219/74 |
| 2,843,727 A * | 7/1958 | Benz, Jr. et al. | 219/137.42 |
| 2,868,950 A * | 1/1959 | Gage | 219/74 |
| 2,902,587 A * | 9/1959 | Bernard | 219/74 |
| 2,922,023 A * | 1/1960 | Hackman et al. | 219/74 |
| 2,963,570 A * | 12/1960 | Rieppel | 219/74 |
| 3,018,358 A * | 1/1962 | Schaaf, Jr. | 219/72 |
| 3,053,968 A * | 9/1962 | Gorman et al. | 219/74 |
| 3,132,235 A * | 5/1964 | Anderson | 219/75 |
| 3,137,783 A * | 6/1964 | Addie | 219/74 |
| 3,275,796 A * | 9/1966 | Bernard et al. | 219/137.71 |

(Continued)

FOREIGN PATENT DOCUMENTS

| | | |
|---|---|---|
| JP | A-59-144578 | 8/1984 |
| JP | A-08-267250 | 10/1996 |

(Continued)

OTHER PUBLICATIONS

Notice of Reasons for Rejection issued in Japanese Patent Application No. 2011-220065 dated Jan. 15, 2013 (with translation).

(Continued)

*Primary Examiner* — Eric Stapleton
(74) *Attorney, Agent, or Firm* — Oliff PLC

(57) ABSTRACT

An arc welding apparatus disclosed in this specification includes: first electrode; second electrode; and a first gas supply unit which supplies a first shielding gas from the circumference of a base material-side portion of an arc region formed between the first electrode and a base material connected to the second electrode toward the center of the arc region, and controls the ratio of the pressure outside the arc region to the pressure at the center of the arc region to within the range of 70 to 5000.

22 Claims, 16 Drawing Sheets

(56) References Cited

U.S. PATENT DOCUMENTS

| | | | |
|---|---|---|---|
| 3,319,042 A * | 5/1967 | Thostrup et al. | 219/137.42 |
| 3,432,637 A * | 3/1969 | Witting | 219/74 |
| 3,471,674 A * | 10/1969 | Gage | 219/74 |
| 3,497,670 A * | 2/1970 | Thostrup | 219/137.42 |
| 3,597,576 A * | 8/1971 | Bernard et al. | 219/137.43 |
| 3,673,374 A * | 6/1972 | Hauck | 219/73.11 |
| 3,746,832 A * | 7/1973 | Bernard et al. | 219/137.9 |
| 3,811,027 A * | 5/1974 | Strahan | 219/74 |
| 3,967,090 A * | 6/1976 | Hamasaki et al. | 219/70 |
| 4,035,602 A * | 7/1977 | Berghof | 219/72 |
| 4,090,057 A * | 5/1978 | Okada | 219/122 |
| 4,154,999 A * | 5/1979 | Pinfold et al. | 219/72 |
| 4,158,763 A * | 6/1979 | Moerke | 219/137.42 |
| 4,172,974 A * | 10/1979 | Stingelin et al. | 219/72 |
| 4,278,864 A * | 7/1981 | De Facci et al. | 219/75 |
| 4,341,237 A * | 7/1982 | Stauffer | 137/382.5 |
| 4,371,775 A * | 2/1983 | Mihara et al. | 219/121.46 |
| 4,527,038 A * | 7/1985 | Cuny et al. | 219/75 |
| 4,541,055 A * | 9/1985 | Wolfe et al. | 700/166 |
| 4,544,825 A * | 10/1985 | Cook | 219/137 R |
| 4,595,820 A * | 6/1986 | Richardson | 219/137 PS |
| 4,711,986 A * | 12/1987 | Lillquist et al. | 219/130.01 |
| 4,782,204 A * | 11/1988 | Gartland | 219/74 |
| 4,791,270 A * | 12/1988 | Nelson et al. | 219/125.1 |
| 4,845,331 A * | 7/1989 | Yeo et al. | 219/72 |
| 4,851,636 A * | 7/1989 | Sugimoto et al. | 219/121.59 |
| 5,124,527 A * | 6/1992 | Takano et al. | 219/137.2 |
| 5,220,246 A * | 6/1993 | Ide et al. | 315/111.01 |
| 5,302,804 A * | 4/1994 | McGee et al. | 219/121.51 |
| 5,304,776 A * | 4/1994 | Buerkel et al. | 219/125.11 |
| 5,390,846 A * | 2/1995 | Thode | 228/219 |
| 5,491,321 A * | 2/1996 | Stuart et al. | 219/137.61 |
| 5,544,195 A * | 8/1996 | Hardt et al. | 373/79 |
| 5,614,117 A * | 3/1997 | Krobath | 219/147 |
| 5,690,844 A * | 11/1997 | White et al. | 219/121.47 |
| 5,734,144 A * | 3/1998 | Yamaguchi et al. | 219/121.46 |
| 5,780,804 A * | 7/1998 | White et al. | 219/121.46 |
| 5,824,983 A * | 10/1998 | Huddleston, Jr. | 219/61 |
| 5,938,948 A * | 8/1999 | Oros et al. | 219/121.46 |
| 5,938,954 A * | 8/1999 | Onuma et al. | 219/121.84 |
| 5,961,856 A * | 10/1999 | Fusaro et al. | 219/121.47 |
| 6,172,320 B1* | 1/2001 | Krishnan et al. | 219/74 |
| 6,255,618 B1* | 7/2001 | Shintani et al. | 219/121.46 |
| 6,331,694 B1* | 12/2001 | Blankenship | 219/137 PS |
| 6,359,251 B1* | 3/2002 | Picard et al. | 219/121.57 |
| 6,371,359 B1* | 4/2002 | Kimura et al. | 228/175 |
| 6,388,227 B1* | 5/2002 | Dykhno et al. | 219/121.6 |
| 6,392,184 B1* | 5/2002 | Yokota et al. | 219/74 |
| 6,420,680 B1* | 7/2002 | Samodell | 219/132 |
| 6,423,936 B1* | 7/2002 | Reed | 219/130.21 |
| 6,555,779 B1* | 4/2003 | Obana et al. | 219/121.63 |
| 6,610,957 B2* | 8/2003 | Uttrachi | 219/74 |
| 6,622,058 B1* | 9/2003 | Picard et al. | 700/117 |
| 6,727,465 B1* | 4/2004 | Kislovsky et al. | 219/125.11 |
| 6,753,497 B1* | 6/2004 | Matus et al. | 219/121.46 |
| 6,772,040 B1* | 8/2004 | Picard et al. | 700/166 |
| 6,841,753 B1* | 1/2005 | Hughes | 219/121.46 |
| 6,933,463 B2* | 8/2005 | Yamaguchi et al. | 219/121.57 |
| 6,947,802 B2* | 9/2005 | Picard et al. | 700/117 |
| 7,015,412 B1* | 3/2006 | Uttrachi | 219/74 |
| 7,019,248 B1* | 3/2006 | Uttrachi | 219/74 |
| 7,241,970 B2* | 7/2007 | Fortain et al. | 219/129 |
| 7,462,799 B2* | 12/2008 | Uttrachi | 219/74 |
| 7,544,913 B2* | 6/2009 | Helenius et al. | 219/121.49 |
| 7,673,786 B2* | 3/2010 | Menotti | 228/214 |
| 8,258,421 B2* | 9/2012 | Halvorsen et al. | 219/74 |
| 8,637,166 B2* | 1/2014 | Ayer et al. | 428/679 |
| 2002/0144979 A1* | 10/2002 | Fedorcak | 219/74 |
| 2002/0185473 A1* | 12/2002 | Carlson et al. | 219/76.15 |
| 2003/0015510 A1* | 1/2003 | Wakeman | 219/137.31 |
| 2003/0019845 A1* | 1/2003 | Uttrachi | 219/74 |
| 2003/0062352 A1* | 4/2003 | Kislovsky et al. | 219/130.21 |
| 2003/0094443 A1* | 5/2003 | Barnett | 219/121.46 |
| 2003/0136768 A1* | 7/2003 | Sonoda et al. | 219/121.64 |
| 2003/0183638 A1* | 10/2003 | Minta et al. | 220/560.13 |
| 2003/0204283 A1* | 10/2003 | Picard et al. | 700/166 |
| 2004/0232130 A1* | 11/2004 | Sonoda et al. | 219/137 R |
| 2005/0035093 A1* | 2/2005 | Yamaguchi et al. | 219/121.39 |
| 2005/0127043 A1* | 6/2005 | Albrecht et al. | 219/74 |
| 2005/0161450 A1* | 7/2005 | Stava | 219/133 |
| 2005/0167468 A1* | 8/2005 | Kislovsky et al. | 228/8 |
| 2005/0205530 A1* | 9/2005 | Picard et al. | 219/121.6 |
| 2005/0205542 A1* | 9/2005 | DeCoster et al. | 219/137.62 |
| 2005/0211687 A1* | 9/2005 | Sonoda et al. | 219/137 R |
| 2005/0224466 A1* | 10/2005 | Halvorsen | 219/74 |
| 2006/0071096 A1* | 4/2006 | Vavra | 239/338 |
| 2006/0108333 A1* | 5/2006 | Picard et al. | 219/121.62 |
| 2006/0186094 A1* | 8/2006 | Krink et al. | 219/121.55 |
| 2006/0213892 A1* | 9/2006 | Ott | 219/132 |
| 2006/0219674 A1* | 10/2006 | Picard et al. | 219/121.62 |
| 2006/0237411 A1* | 10/2006 | Mendez et al. | 219/137 R |
| 2006/0242818 A1* | 11/2006 | Penick et al. | 29/560 |
| 2006/0278623 A1* | 12/2006 | Christopher et al. | 219/137.7 |
| 2006/0278624 A1* | 12/2006 | Christopher et al. | 219/137.7 |
| 2006/0278625 A1* | 12/2006 | Christopher et al. | 219/137.31 |
| 2006/0278626 A1* | 12/2006 | Christopher et al. | 219/137.31 |
| 2006/0285108 A1* | 12/2006 | Morrisroe | 356/316 |
| 2006/0286492 A1* | 12/2006 | Morrisroe | 431/2 |
| 2006/0289406 A1* | 12/2006 | Helenius et al. | 219/121.48 |
| 2007/0095536 A1* | 5/2007 | Vinegar et al. | 166/302 |
| 2007/0164000 A1* | 7/2007 | Uttrachi | 219/74 |
| 2007/0181540 A1* | 8/2007 | Lindsay | 219/121.5 |
| 2007/0284108 A1* | 12/2007 | Roes et al. | 166/302 |
| 2008/0053965 A1* | 3/2008 | Laymon et al. | 219/74 |
| 2008/0128134 A1* | 6/2008 | Mudunuri et al. | 166/302 |
| 2009/0039062 A1* | 2/2009 | Cretegny et al. | 219/129 |
| 2009/0155623 A1* | 6/2009 | Ayer et al. | 428/680 |
| 2009/0236320 A1* | 9/2009 | Enatsu et al. | 219/74 |
| 2009/0314750 A1* | 12/2009 | Saitoh et al. | 219/121.64 |
| 2010/0051586 A1* | 3/2010 | Guerrina et al. | 219/59.1 |
| 2010/0133240 A1* | 6/2010 | Takahashi et al. | 219/74 |
| 2010/0258534 A1* | 10/2010 | Hughes | 219/75 |
| 2010/0270269 A1* | 10/2010 | Khakhalev et al. | 219/74 |
| 2010/0276398 A1* | 11/2010 | Halvorsen et al. | 219/74 |
| 2010/0301018 A1* | 12/2010 | Holt | 219/74 |
| 2011/0171485 A1* | 7/2011 | Kawamoto et al. | 428/576 |
| 2012/0012560 A1* | 1/2012 | Roberts et al. | 219/74 |
| 2012/0175350 A1* | 7/2012 | Birch et al. | 219/74 |
| 2012/0187094 A1* | 7/2012 | Shirai et al. | 219/74 |
| 2013/0112660 A1* | 5/2013 | Enyedy et al. | 219/74 |
| 2013/0140280 A1* | 6/2013 | Biskup et al. | 219/74 |
| 2014/0083981 A1* | 3/2014 | Amata et al. | 219/74 |
| 2014/0091066 A1* | 4/2014 | Enyedy et al. | 219/74 |
| 2014/0144893 A1* | 5/2014 | Yang | 219/121.64 |
| 2014/0263247 A1* | 9/2014 | Hillen et al. | 219/137 R |
| 2014/0367366 A1* | 12/2014 | Bertram et al. | 219/74 |

FOREIGN PATENT DOCUMENTS

| | | |
|---|---|---|
| JP | A-9-76071 | 3/1997 |
| JP | B-2670076 | 10/1997 |
| JP | A-11-241168 | 9/1999 |
| JP | A-2000-291850 | 10/2000 |
| JP | A-2003-053543 | 2/2003 |

OTHER PUBLICATIONS

Feb. 18, 2014 Office Action issued in Japanese Application No. 2013-042256 (with translation).

* cited by examiner $$\frac{x^2}{1-x^2} \cdot P = A \cdot T^{2.5} \cdot \exp\left[-\left(\frac{eVi}{kT}\right)\right]$$

IONIZED REGION WIDTH L

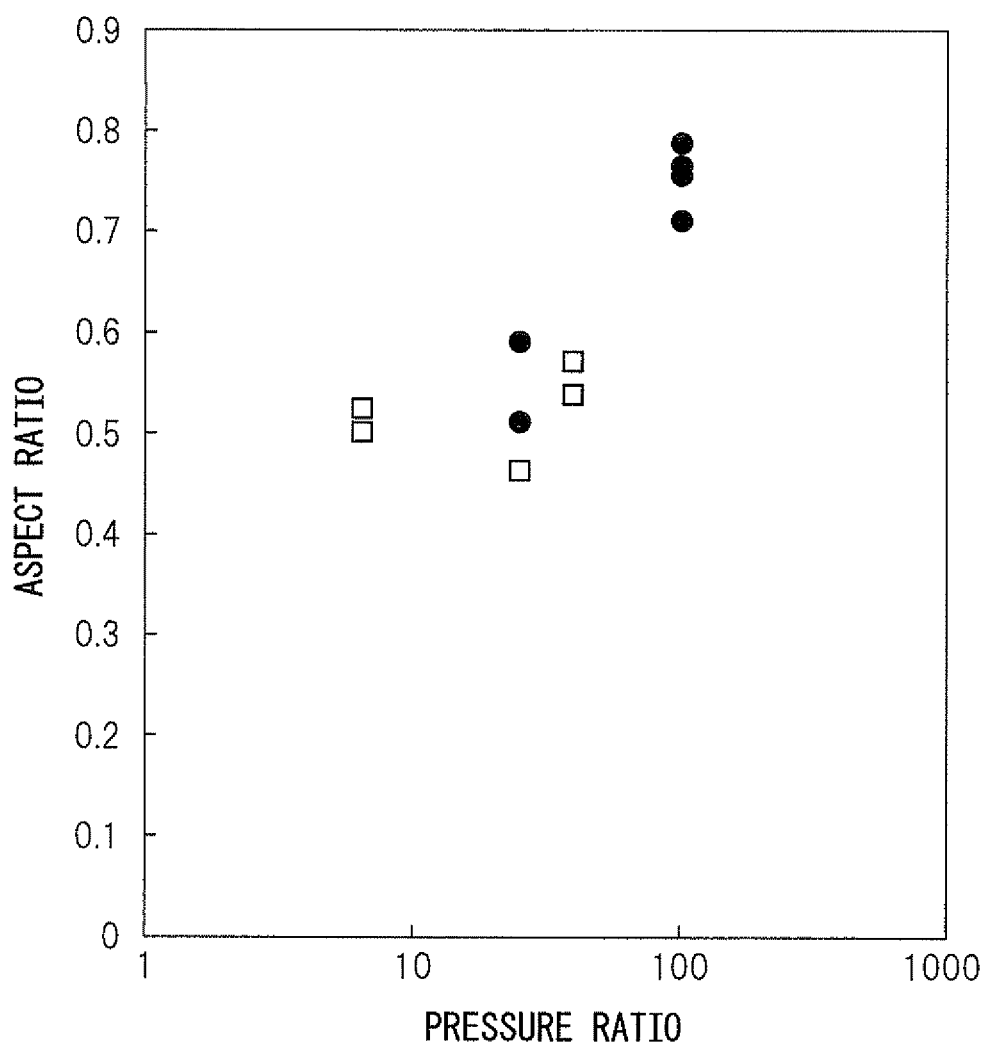

FIG. 10

|  | IONIZATION VOLTAGE (eV) | DENSITY (kg/m³) |
|---|---|---|
| Ar | 15.76 | 1.784 |
| He | 24.59 | 0.1785 |

F I G . 18

|  |  | WORKING EXAMPLE | COMPARATIVE EXAMPLE |  |
|---|---|---|---|---|
| PRESSURE RATIO |  | 100 | 1 | 100 TIMES |
| ENERGY DENSITY (W/mm²) |  | 1000 | 100 | 10 TIMES |
| WELD ZONE DIMENSIONS (mm) | WIDTH | 1.20 | 1.75 | −32% |
|  | DEPTH | 0.9 | 0.57 | 58% |
| ASPECT RATIO |  | 0.75 | 0.32 | 2.3 TIMES |

WELDING METHOD AND WELDING APPARATUS

CROSS-REFERENCE TO RELATED APPLICATIONS

The Applicant claims the right to priority based on Japanese Patent Applications JP 2011-014107, filed on Jan. 26, 2011, and JP 2011-220065 filed on Oct. 4, 2011, and the entire contents of JP 2011-014107 and JP 2011-220065 are hereby incorporated by reference.

BACKGROUND OF THE INVENTION

1. Field of the Invention

The present invention relates to a welding method and a welding apparatus.

2. Description of the Related Art

Traditionally, arc welding has been used for welding work.

In one type of arc welding, welding current is supplied to an electrode and the second electrode may be connected to ground, and a shielding gas is introduced into the space between electrode and base material, the shielding gas thus ionized generates electrons having kinetic energy. The generated electrons form an arc region between an electrode and the base material. The electrons within the arc region impinge on the base material and impart kinetic energy to the base material which is thus melted.

FIG. 1 is a diagram showing an arc welding apparatus.

The arc welding apparatus comprises: a welding power supply not shown; first electrode 101 to which welding current is supplied from the power supply; the second electrode is not shown; and a cylindrically shaped gas nozzle 102 for supplying a shielding gas along the electrode toward a base material.

To weld the base material, welding current is supplied from the welding power supply to electrode 101 and the second electrode, while supplying the shielding gas through the gas nozzle 102, and an arc region 103 is thus formed between the first electrode and the base material. Since the arc region 103 is held down against the base material by the pressure of the shielding gas being supplied from above, the portion thereof contacting the base material spreads out, increasing the welding width W. That is, the arc area 103 has a shape spreading downward.

In arc welding, therefore, the energy density of the portion of the arc region contacting the base material is low, and as a result, the ratio of the melt depth to the welding width W of the weld zone is small, i.e., in the case of arc welding, the aspect ratio which is the ratio of the melt depth to the welding width W of the weld zone is low. Accordingly, arc welding is neither suitable for welding that requires low distortion nor for high-speed welding, and is mainly used for coarse-precision welding work.

On the other hand, for welding that requires low distortion or for high-speed welding, laser welding is common. With laser welding, a weld zone having a high aspect ratio can be formed because the energy density of the melt zone is high.

Patent documents relating to arc welding include, for example, Japanese Unexamined Patent Publication Nos. H08-267250 and 2003-53543, Japanese Patent No. 2670076, and Japanese Unexamined Patent Publication H11-241168.

SUMMARY OF THE INVENTION

However, laser welding has the problem that welding equipment cost is high.

A variant form of arc welding, plasma welding enhances the energy density of the arc region by using a water-cooled contact tip.

However, plasma welding has the problem of higher equipment cost than the equipment cost of conventional arc welding. Plasma welding has the further problem that its output is limited because of the heat to which the contact tip is subjected.

Furthermore, for arc welding, a method that can form a weld zone having a high aspect ratio using less costly welding equipment has not been disclosed in the related art.

It is an object of the present invention to provide a welding method for arc welding that solves the above-outlined problems.

It is also an object of the present invention to provide a welding apparatus for arc welding that solves the above-outlined problems.

A welding method according to a first invention disclosed in this specification is characterized in that arc welding is performed by supplying a first shielding gas from a circumference of a base material-side portion of an arc region (13) formed between a first electrode (11) and a base material (20) connected to a second electrode (12) toward a center of the arc region (13), and by controlling the ratio of pressure outside the arc region (13) to pressure at the center of the arc region (13) to within the range of 70 to 5000.

With this arrangement, since the base material-side portion of the arc region is compressed around its circumference by the flowing pressure of the first shielding gas, a highly ionized and narrow arc region is formed. Then, by melting the base material utilizing this highly ionized and narrow arc region, a weld zone having a high aspect ratio is formed. Furthermore, since the pressure ratio can be controlled to within the above-described range by adjusting the flow rate of the first shielding gas or by adjusting the nozzle diameter and nozzle height, the welding method of the first invention can be implemented at low cost.

Preferably, in the first invention, the arc welding is performed by supplying the first shielding gas so that the supplied first shielding gas flows along a base material side of a nozzle plate 14 having an opening (14a) through which passes the arc region (13) formed between the first electrode (11) and the base material (20) connected to the second electrode (12) and is drawn to the same side as the first electrode (11), and by controlling the ratio of the pressure outside the arc region to the pressure at the center of the arc region (13) on the base material side of the nozzle plate (14) to within the range of 70 to 5000.

With this arrangement, the first shielding gas can be made to flow to the same side as the first electrode through the space between the opening and the arc region, while applying pressure around the circumference of the base material-side portion of the arc region; this serves to stabilize the shape of the narrow and highly ionized arc region.

Further, preferably in the first invention, the ratio of the area of the opening (14a) to the cross-sectional area of the portion of the arc region (13) that passes through the opening (14a) is not less than 1 but not larger than 35, or the flow rate of the first shielding gas that flows through the opening (14a) is not less than 5 liters per minute but not larger than 35 liters per minute, or the opening (14a) is circular in shape and the ratio of the spacing between the nozzle plate (14) and the base material (20) to the diameter of the opening (14a) is not less than 1 but not larger than 20.

With this arrangement, the first shielding gas can be made to flow to the same side as the first electrode through the space between the opening and the arc region, while applying pressure around the circumference of the arc region and without damaging the arc region; this serves to further stabilize the shape of the narrow and highly ionized arc region.

Preferably, in the first invention, a second shielding gas is supplied from the same side as the first electrode (11) toward the opening (14a). Further preferably, the ionization voltage of the second shielding gas is lower than the ionization voltage of the first shielding gas, or the first shielding gas is chosen to have a higher density than the second shielding gas. With this arrangement, the degree of ionization can be further enhanced while reducing the width of the arc region.

Preferably, in the first invention, while expanding the spacing between the first electrode (11) and the base material (20), control is performed to increase the voltage applied between the first electrode (11) and the second electrode (12) so that the current flowing between the first electrode (11) and the second electrode (12) is maintained constant. Further, preferably when the voltage applied between the first electrode (11) and the second electrode (12) exceeds a predetermined threshold value, control is performed so as to stop expanding the spacing between the first electrode (11) and the base material (20). With this arrangement, arc welding with enhanced energy density can be performed by increasing the amount of heat input.

A welding apparatus according to a second invention disclosed in this specification comprises: first electrode (11); a second electrode (12); and a first gas supply unit (15) which supplies a first shielding gas from a circumference of a base material-side portion of an arc region (13) formed between the first electrode (11) and a base material (20) connected to the second electrode (12) toward a center of the arc region (13), and controls the ratio of the pressure outside the arc region to the pressure at the center of the arc region (13) to within the range of 70 to 5000.

With this arrangement, since the base material-side portion of the arc region is compressed around its circumference by the flowing pressure of the first shielding gas, a highly ionized and narrow arc region is formed. Then, by melting the base material utilizing this highly ionized and narrow arc region, a weld zone having a high aspect ratio is formed. Furthermore, since the pressure ratio can be controlled to within the above-described range by adjusting the flow rate of the first shielding gas, the welding apparatus of the second invention can be manufactured at low cost.

Preferably, the welding apparatus of the second invention further comprises a nozzle plate (14) having an opening (14a) through which passes the arc region (13) formed between the first electrode (11) and the base material (20) connected to the second electrode (12), and wherein the first gas supply unit (15) supplies the first shielding gas to a base material side of the nozzle plate (14), and controls the ratio of the pressure outside the arc region to the pressure at the center of the arc region (13) on the base material side of the nozzle plate (14) to within the range of 70 to 5000.

With this arrangement, the first shielding gas can be made to flow to the same side as the first electrode through the space between the opening and the arc region, while applying pressure around the circumference of the base material-side portion of the arc region; this serves to stabilize the shape of the narrow and highly ionized arc region.

Preferably, in the welding apparatus of the second invention, the first gas supply unit (15) includes a first gas supply pipe (15a) which supplies the first shielding gas to the base material side of the nozzle plate (14), a first pressure sensor (15b) which measures the pressure at the center of the arc region (13) on the base material side of the nozzle plate (14), a second pressure sensor (15c) which measures the pressure outside the arc region on the base material side of the nozzle plate (14), and a control unit (15d) which takes as inputs measured values from the first and second pressure sensors (15c, 15d) and controls the amount of the first shielding gas to be supplied through the first gas supply pipe (15a) so that the ratio of the pressure outside the arc region to the pressure at the center of the arc region (13) on the base material side of the nozzle plate (14) is maintained within the range of 70 to 5000.

With this arrangement, the ratio of the pressure outside the arc region to the pressure at the center of the arc region on the base material side of the nozzle plate can be controlled within the range of 70 to 5000 by supplying the first shielding gas to the base material side of the insulating plate.

Preferably, the welding apparatus of the second invention further comprises a second gas supply unit (17) which supplies a second shielding gas from the same side as the first electrode (11) toward the opening (14a).

With this arrangement, by suitably selecting the ionization voltages or densities of the first shielding gas and the second shielding gas, respectively, the degree of ionization can be further enhanced while reducing the width of the arc region.

Preferably, the second embodiment further includes a driving unit (21) which drives the first electrode (11) in such a way as to vary the spacing between the first electrode (11) and the base material (20); a driving control unit (22) which controls the driving unit (21); and a power supply (16) which supplies a constant current between the first electrode (11) and the second electrode (12), and wherein: the driving control unit (22) controls the driving unit (21) to expand the spacing between the first electrode (11) and the base material (20), and the power supply (16) increases the voltage applied between the first electrode (11) and the second electrode (12) so that the current flowing between the first electrode (11) and the base material (20) is maintained constant. Further, preferably when the voltage applied between the first electrode (11) and the second electrode (12) exceeds a predetermined threshold value, the driving control unit (22) controls the driving unit (21) to stop driving the first electrode (11).

Reference numerals in parentheses suffixed to the names of the respective means described above indicate their correspondence to the specific means described in the embodiments hereinafter given.

BRIEF DESCRIPTION OF THE DRAWINGS

These and other features and advantages of the present invention will be better understood by reading the following detailed description taken together with the drawings, wherein:

FIG. 8B is a diagram (part 2) showing the relationship between pressure ratio and aspect ratio;

FIG. 10 is a diagram showing the densities and ionization voltages of shield gases;

FIG. 18 is a diagram showing welding results of a working example and a comparative example, respectively.

DESCRIPTION OF EMBODIMENTS

The preferred embodiments of the welding apparatus disclosed in this specification will be described below with reference to the drawings. It will, however, be noted that the technical scope of the present invention is not limited to the specific embodiments disclosed herein, but extends to the inventions described in the appended claims and their equivalents.

Figure 2A:
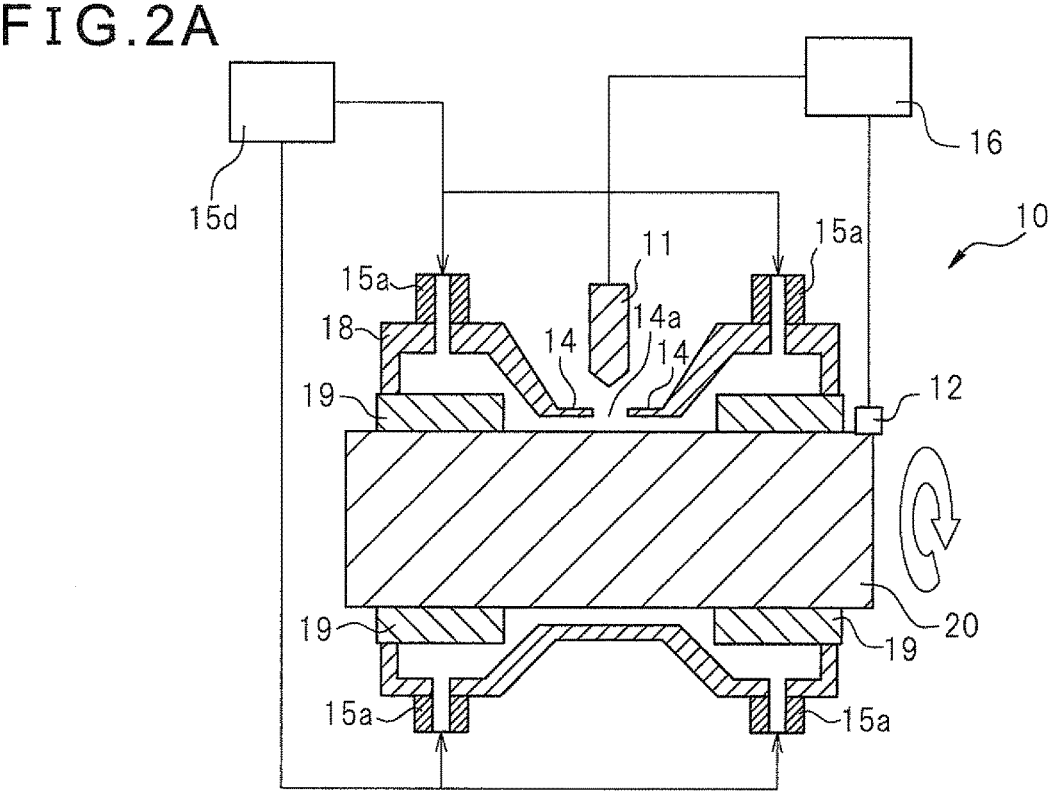
FIG. 2A is a cross-sectional view showing a first embodiment of a welding apparatus disclosed in this specification.
Figure 2B:
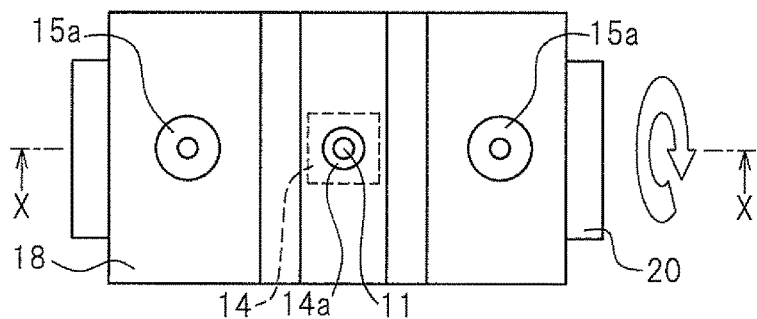
FIG. 2B is a top plan view of FIG. 2A.
Figure 2C:
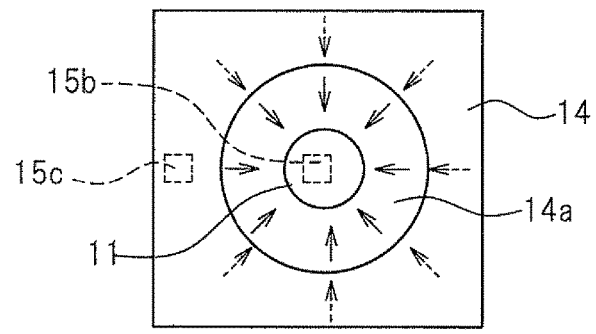
FIG. 2C is an enlarged view of an essential portion shown enclosed by dashed lines in FIG. 2B.
Figure 3A:
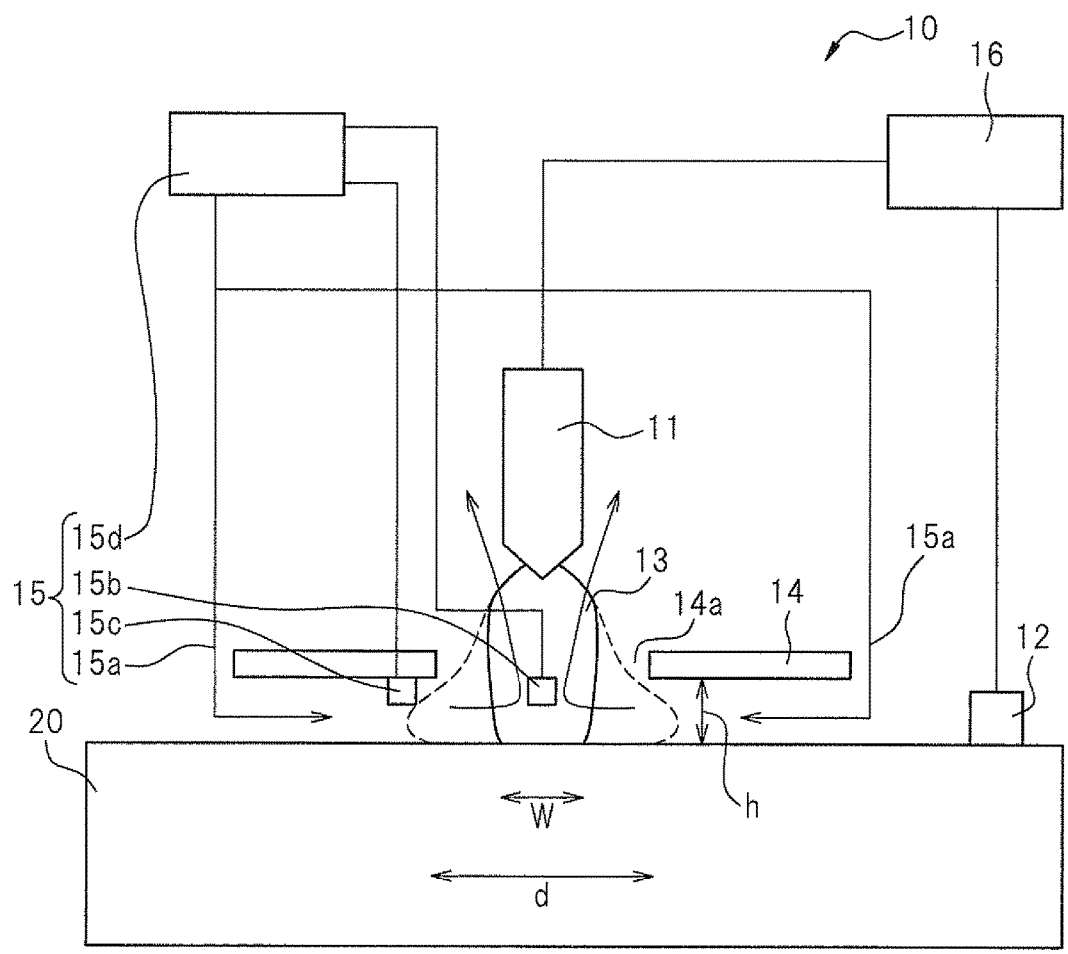
FIG. 3A is an enlarged view of an essential portion of FIG. 2A.
Figure 3B:
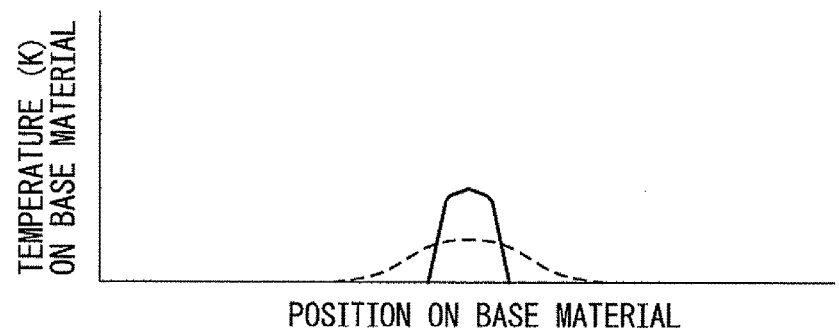
FIG. 3B is a diagram showing a welding temperature distribution on a base material.

FIG. 2A is a cross-sectional view showing a first embodiment of the welding apparatus disclosed in this specification, FIG. 2B is a top plan view of FIG. 2A, and FIG. 2C is an enlarged view of an essential portion shown enclosed by dashed lines in FIG. 2B. FIG. 3A is an enlarged view of an essential portion of FIG. 2A, and FIG. 3B is a diagram showing a welding temperature distribution on a base material.

The welding apparatus 10 according to this embodiment creates a narrow and highly ionized arc region by introducing a shielding gas toward the center of the arc region from the circumference of the base material-side portion of the arc region, and forms a weld zone having a high aspect ratio by melting the base material utilizing this narrow and highly ionized arc region.

The welding apparatus 10 includes a rod-like electrode 11 as first electrode, an electrode 12 as the second electrode, a nozzle plate 14 having a circular opening 14a formed so as to allow the arc region 13, formed between the first electrode 11 and the base material 20 connected to the second electrode 12, to pass therethrough, and a first gas supply unit 15 which supplies a first shielding gas to the base material side of the nozzle plate 14 and controls the ratio of the pressure at a position outside the arc region to the pressure at the center of the arc region 13 on the base material side of the nozzle plate 14 to within the range of 70 to 5000.

The welding apparatus 10 further includes a casing 18 for supporting the cylindrically formed base material 20. The casing supports the cylindrically formed base material 20 in a rotatable manner. The base material 20 is rotated by a driving unit not shown. The nozzle plate 14 is disposed in the center of the casing 18 as shown in FIG. 2A. The nozzle plate 14 may be formed integrally with the casing 18.

An electrically insulating member 19 is placed between the casing 18 and the base material 20 which are thus electrically insulated from each other by the electrically insulating member 19. The electrically insulating member 19 seals the space between the casing 18 and the base material 20 and prevents the shielding gas from leaking outside, while allowing the base material 20 to rotate. FIG. 2A is a cross-sectional view taken along line X-X in FIG. 2B. In FIGS. 2A and 2B, first and second pressure sensors 15b and 15c to be described hereinafter are not shown.

As shown in FIG. 3A, the first gas supply unit 15 includes a first gas supply pipe 15a which supplies the first shielding gas to the base material side of the nozzle plate 14, the first pressure sensor 15b which measures the pressure at the center of the arc region 13 on the base material side of the nozzle plate 14, the second pressure sensor 15c which measures the pressure at a position outside the arc region on the base material side of the nozzle plate 14, and a control unit 15d which takes as inputs the measured values from the first and second pressure sensors 15b and 15c and controls the amount of the first shielding gas to be supplied through the first gas supply pipe 15a so that the ratio of the pressure at the position outside the arc region to the pressure at the center of the arc region 13 on the base material side of the nozzle plate 14 is maintained within the range of 70 to 5000. Hereinafter, the ratio of the pressure at the position outside the arc region to the pressure at the center of the arc region 13 on the base material side of the nozzle plate 14 may be referred to simply as the pressure ratio.

As shown in FIG. 2A, the first gas supply unit 15 actually has four first gas supply pipes 15a. Each first gas supply pipe 15a is connected to the casing 18. The first shielding gas, introduced through the four first gas supply pipes 15a, passes between the casing 18 and the base material 20 and is fed into the space on the base material side of the nozzle plate 14. The first shielding gas is ionized to form the arc region 13. Further, the first shielding gas serves to shield the molten weld zone from the atmosphere.

The opening 14a is formed in the center of the electrically insulating nozzle plate 14. The first electrode 11 is placed so as to be located in the center of the opening 14a. The arc region 13 is formed between the first electrode 11 and the base material 20 by passing through the center of the opening 14a.

The first shielding gas fed through the first gas supply pipes 15a into the casing 18 is prevented by the electrically insulating member 19 from leaking outside the casing 18. Accordingly, the first shielding gas fed into the casing 18 flows along the base material side of the nozzle plate 14 and is drawn to the same side as the first electrode 11 by passing through the opening 14a. The first shielding gas drawn to the same side of the nozzle plate 14 as the first electrode 11 may be exhausted by means of an exhaust unit not shown.

As shown by arrows in FIG. 2C, the first shielding gas introduced through the first gas supply pipes 15a into the space on the base material side of the nozzle plate 14 flows toward the center of the arc region 13 from the circumference of the base material-side portion of the arc region 13. The arc region 13 thus subjected to the pressure of the first shielding gas around its circumference gets compressed toward its center, resulting in the formation of the narrow and highly ionized arc region 13.

In this specification, the base material-side portion of the arc region 13 is preferably a portion located nearer to the base material than is a point halfway down the length of the arc region 13 formed between the first electrode 11 and the base material 20 connected to the second electrode 12, and more preferably a portion located nearer to the base material than is a point located two-thirds down the length of the arc region 13.

In the arc region 13, the first shielding gas may be introduced not only into the base material-side portion of the arc region 13 but also into the first electrode-side portion of the arc region 13. The height along which the first shielding gas is introduced into the arc region 13 can be changed by adjusting the spacing, h, between the nozzle plate 14 and the base material 20.

The first pressure sensor 15b may be held fixed by a known method in the center of the arc region 13. The second pressure sensor 15c may be fixed by a known method to the base material side of the nozzle plate 14.

The control unit 15d takes as inputs the measured values from the first and second pressure sensors 15b and 15c, and controls the amount of the first shielding gas to be supplied through the first gas supply pipe 15a so that the pressure ratio is maintained within the range of 70 to 5000.

Any known control method may be used for the control unit 15d to control the pressure ratio. For example, feedback control may be used as the control method. In the feedback control, the ratio of the value measured by the second pressure sensor 15c to the value measured by the first pressure sensor 15b is taken as the current pressure ratio, and the amount of the first shielding gas to be supplied through the first gas supply pipe 15a is controlled so that the difference between the current pressure ratio and the target pressure ratio becomes zero.

Preferably, the first and second pressure sensors 15d and 15c have heat resistance necessary to withstand the temperature of the arc region 13.

The control unit 15d may take the measured values from the first and second pressure sensors 15b and 15c continuously or at predetermined intervals of time and thereby control the amount of the first shielding gas to be supplied through the first gas supply pipe 15a so that the pressure ratio is maintained within the range of 70 to 5000.

Alternatively, the control unit 15d may determine the amount of the first shielding gas to be supplied through the first gas supply pipe 15a by taking values from the first and second pressure sensors 15b and 15c only when there occurs a change in welding conditions, and may thereafter supply the first shielding gas through the first gas supply pipe 15a, based on the thus determined amount of the first shielding gas, without taking values from the first and second pressure sensors 15b and 15c, as long as the welding conditions remain unchanged. In that case, the first and second pressure sensors 15b and 15c need be placed within the arc region 13 and on the base material side of the nozzle plate 14, respectively, only when measuring the pressures, and need not be placed within the arc region 13 or on the base material side of the nozzle plate 14 when not measuring the pressures.

Further, the amount of the first shielding gas to be supplied through the first gas supply pipe 15a may be determined so that the pressure ratio is maintained within the range of 70 to 5000 when no arc discharge occurs. Furthermore, the amount of the first shielding gas to be supplied through the first gas supply pipe 15a may be determined through calculations by thermal conduction analysis simulation, etc.

The welding apparatus 10 further includes a welding power supply 16 which supplies welding current to the first electrode 11 and the second electrode 12. The welding apparatus 10 can supply either DC or AC current to the electrodes. Further, the welding apparatus 10 can supply either continuous or pulse current to the electrodes. When supplying DC current to the electrodes, the welding current is supplied by using the first electrode 11 as the cathode and the second electrode 12 as the anode.

The first electrode 11 and the nozzle plate 14 are each supported by a support member not shown so as not to contact the base material 20.

The base material 20 may have various kinds of joints according to how they are joined together. The base material 20 may be, for example, a metal such as stainless steel or alloyed steel, or a non-ferrous metal such as copper or aluminum. A welded joint may be, for example, of a butt joint, a bevel joint, a lap joint, or a fillet joint. The welding apparatus 10 may further include a welding wire or rod and a means for feeding the welding wire or rod to the weld zone. As the material for forming the electrode 11, use may be made, for example, cerium-containing tungsten, thorium-containing tungsten, lanthana-containing tungsten, etc.

The shape of the arc region 13 formed by the related art welding apparatus is shown by dashed lines in FIG. 3A. As shown, the arc region 13 formed by the related art welding apparatus is bell-shaped, spreading toward the bottom.

On the other hand, the arc region 13 (indicated by solid lines) formed by the welding apparatus 10 is smaller in width, as shown in FIG. 3A. In particular, the width of the arc region 13 is greatly reduced at the base material side thereof, compared with the shape of the related art, and has a vertically extending cylindrical shape as a whole.

Since the width of the arc region 13 formed by the welding apparatus 10 is reduced at the bottom that contacts the base material, as described above, the welding width W is also reduced. The welding apparatus 10 thus creates the narrow and highly ionized arc region 13.

FIG. 3B shows the relationship (solid line) between the position on the base material welded by the welding apparatus 10 and the temperature on the base material. FIG. 3B also shows the relationship (dashed line) between the position on the base material welded by the related welding apparatus and the temperature on the base material. The welding temperature distribution on the base material welded by the welding apparatus 10 is narrower and achieves a higher temperature than the welding temperature distribution of the related art.

Next, a description will be given below of why the welding apparatus 10 performs arc welding by controlling the ratio of the pressure outside the arc region to the pressure at the center of the arc region to within the range of 70 to 5000.

In the arc region 13, some of the gas molecules forming the shielding gas are ionized, and a plasma is formed by a mixture of electrons, ionized gas molecules, and electrically neutral gas molecules. The relationship between the degree of ionization, the pressure, and the temperature in the thus ionized plasma state may be expressed by the Saha thermal ionization equation.

Figures 4, 5:
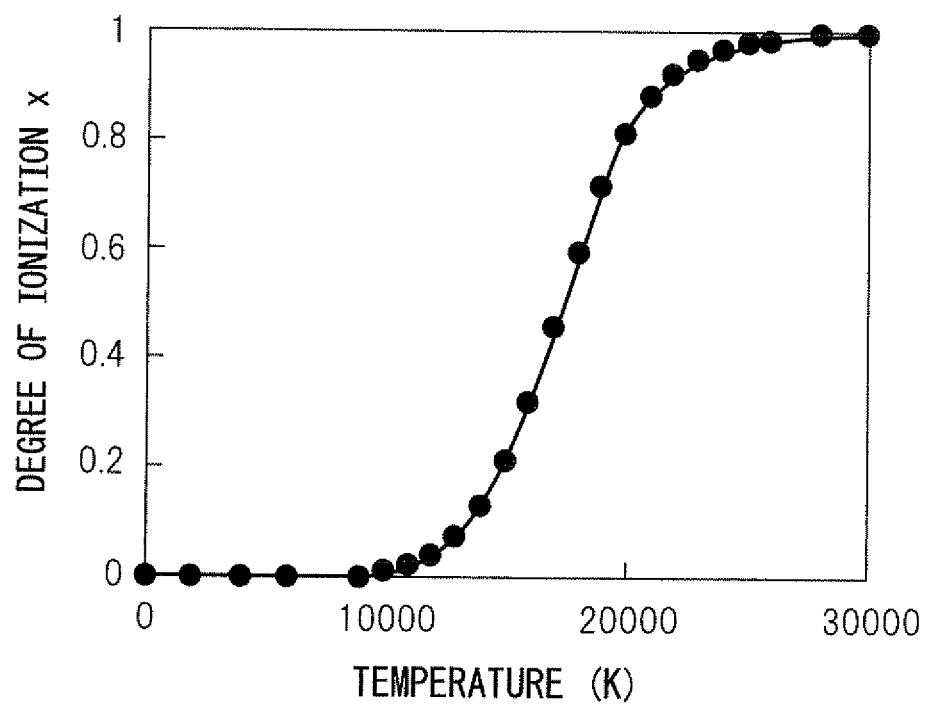
FIG. 4 is a diagram showing the Saha thermal ionization equation.
FIG. 5 is a diagram showing the relationship between temperature and the degree of ionization.

FIG. 4 is a diagram showing the Saha thermal ionization equation.

Here, x is the degree of ionization which represents the proportion of the ionized gas molecules, P is the pressure, A is a constant, T is the absolute temperature, e is the elementary charge, $V_i$ is the ionization voltage of the gas molecules, and k is Boltzmann's constant.

FIG. 5 is a diagram showing the relationship between the temperature and the degree of ionization.

As shown in FIG. 5, in the plasma state, the degree of ionization, x, of the gas molecules increases with increasing temperature, and the rate of increase with temperature decreases as the degree of ionization approaches unity.

Figure 6:
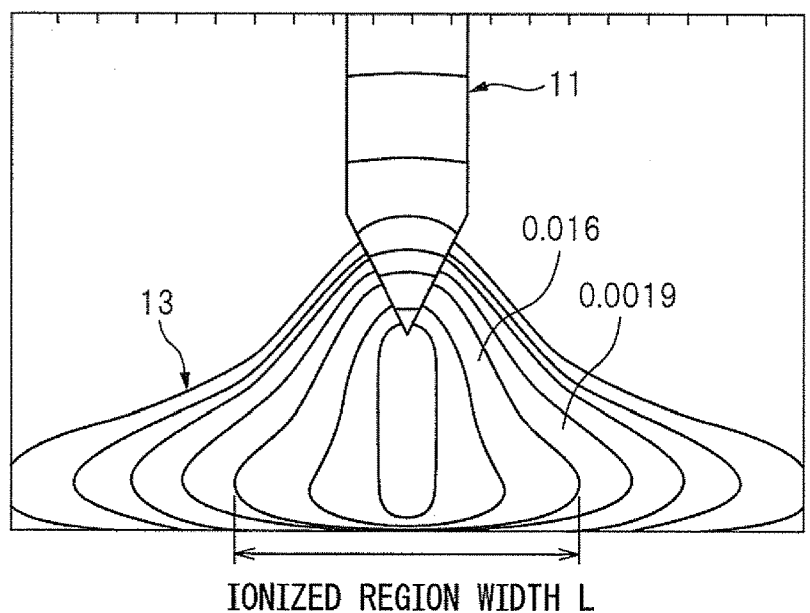
FIG. 6 is a diagram showing the distribution of the degree of ionization of a shielding gas in an arc region.

FIG. 6 is a diagram showing the distribution of the degree of ionization of the shielding gas in the arc region. The distribution of the degree of ionization of the shielding gas in the arc region, illustrated in FIG. 6, was obtained in the following manner. First, the temperature distribution in the arc region was obtained through thermal conduction analysis calculations; then, by substituting the thus obtained temperatures in the arc region into the Saha thermal ionization equation, the distribution of the degree of ionization of the shielding gas in the arc region was obtained.

As shown in FIG. 6, the degree of ionization of gas molecules increases toward the center of the arc region. On the other hand, the degree of ionization of gas molecules decreases with increasing distance from the center of the arc region.

From the relationship between the temperature and the degree of ionization illustrated in FIG. 5, it can be seen that the degree of ionization at which the welding temperature necessary to melt the base material is obtained is 0.016 or greater. Accordingly, the width of the region within which the degree of ionization is 0.016 or greater is designated as the ionized region width L in the distribution of the degree of ionization in the arc region shown in FIG. 6.

From the relationship between the temperature and the degree of ionization illustrated in FIG. 5, it can also be seen that the degree of ionization rapidly increases with temperature when the temperature exceeds about 11000 K. The results summarizing the relationship between the pressure ratio and the degree of ionization are shown in FIG. 7.

Figure 7:
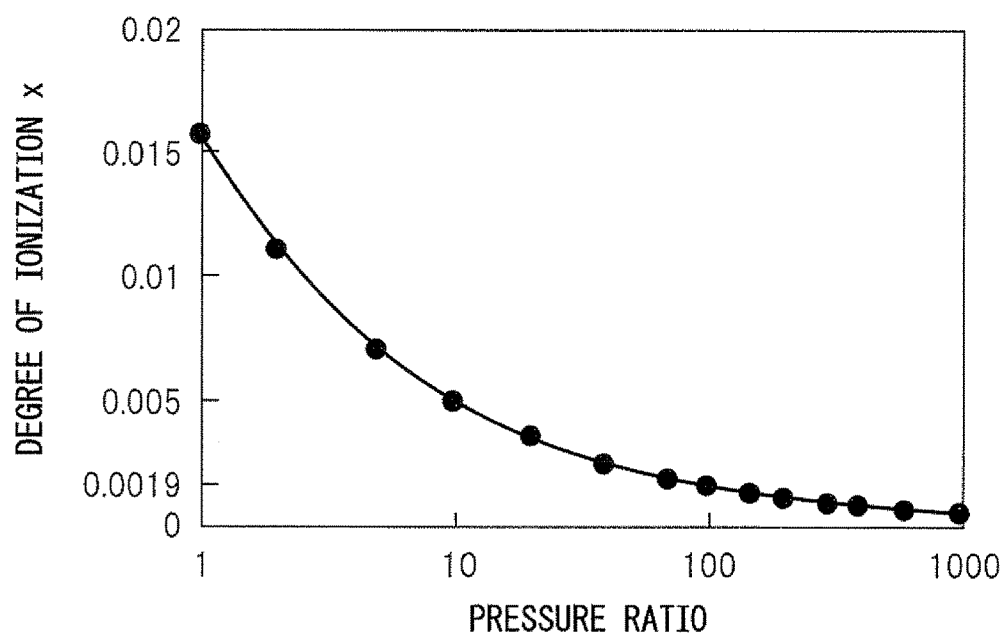
FIG. 7 is a diagram showing the relationship between pressure ratio and the degree of ionization.

FIG. 7 is a diagram showing the relationship between the pressure ratio and the degree of ionization.

Traditionally, arc welding is performed in the region where the degree of ionization is 0.016 or greater. From FIG. 7, it is seen that the pressure ratio where the degree of ionization is 0.016 is 1.

It is also known that when the degree of ionization is about 0.0019, it is not possible to obtain the plasma temperature necessary for arc welding. From FIG. 7, it is seen that the pressure ratio where the degree of ionization is 0.0019 is 70.

It can therefore be seen that when the pressure ratio in the portion where the degree of ionization in the arc region shown in FIG. 6 is 0.016 is increased by 70 or more times, the pressure ratio becomes 70 or greater, and the degree of ionization can thus be held to within 0.0019. This results in the formation of the highly ionized and narrow arc region.

The position at which to measure the pressure at the center of the arc region is preferably located vertically below the center of the first electrode. Further, the position at which to measure the pressure at the center of the arc region is preferably located in the base material-side portion of the arc region.

On the other hand, the position at which to measure the pressure outside the arc region may be in the vicinity of or at some distance away from the arc region, the only requirement being that it be located on the base material side of the nozzle plate 14. Alternatively, the position at which to measure the pressure outside the arc region may be located on the first electrode 11 side of the nozzle plate 14.

The position outside the arc region is preferably spaced away from the arc region 13 by not more than one half of the ionized region width L of the arc region, and more preferably by not more than one third thereof.

Figure 8A:
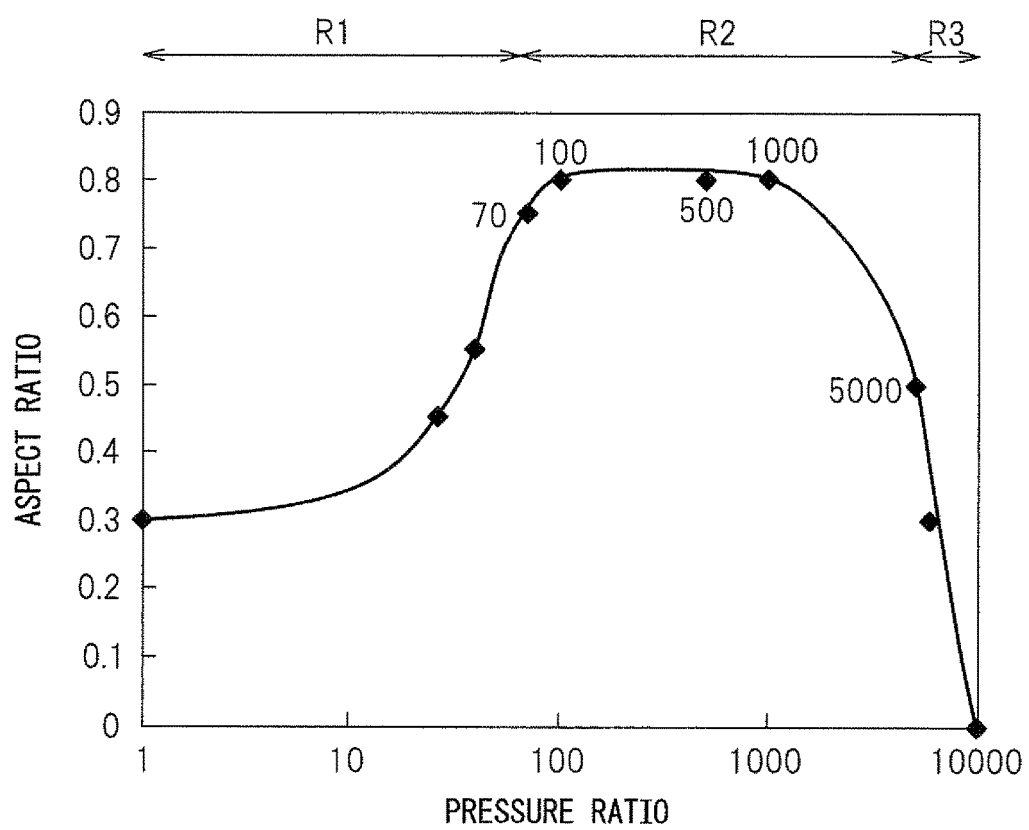
FIG. 8A is a diagram (part 1) showing the relationship between pressure ratio and aspect ratio.

FIG. 8A is a diagram (part 1) showing the relationship between the pressure ratio and the aspect ratio.

In FIG. 8, the aspect ratio, i.e., the ratio of the melt depth to the welding width of the weld zone achieved by arc-welding the base material using the welding apparatus shown in FIGS. 2 and 3, was obtained by experiment and calculation and was plotted as a function of the pressure ratio obtained in a like manner.

In the experiment, the arc welding conditions were as follows: the welding current was 50 A, the flow rate of the shielding gas was 5 to 25 liters per minute, the spacing between the first electrode and the base material was 1 mm, the diameter of the opening was 3 mm, the material used to form the first electrode was cerium-containing tungsten, and the material used as the base material was stainless steel. In FIG. 8A, data for pressure ratios not greater than 100 were obtained by experiment. Further, to calculate the aspect ratio, the melt depth and the welding width of the weld zone achieved by the arc welding were measured, and the ratio of the melt depth to the welding width was obtained. In FIG. 8A, data for pressure ratios not smaller than 500 were obtained by calculation. In the calculation, the gas flow was analyzed by simulation, and the gas distribution that affected the shape of the arc region was obtained. The calculation conditions were the same as those used in the above arc welding experiment. In FIG. 8A, some of the calculated values of the pressure ratio are plotted.

In FIG. 8A, the pressure ratio range is roughly divided into three regions. In region R1, since the pressure ratio is small, the width of the arc region increases, so that the aspect ratio is small. On the other hand, in region R3, since the pressure ratio is large, the flow of the shielding gas is disturbed, and the discharge becomes unsteady and may stop in some cases; as a result, the aspect ratio is small. By contrast, in region R2, since stable arc discharge is formed, and thus a narrow arc region is formed, a high aspect ratio is achieved. It can therefore be seen that it is preferable to perform arc welding within the pressure ratio range defined by region R2. More specifically, the following knowledge has been obtained about the pressure ratio in region R2.

The pressure ratio is preferably 70 or greater, because a narrow and highly ionized arc region can then be formed in a stable manner. More preferably, the pressure ratio is 100 or greater, and particularly preferably 200 or greater, from the standpoint of forming an even narrower and more highly ionized arc region.

Further, the pressure ratio is preferably 5000 or less, because a narrow and highly ionized arc region can then be formed in a stable manner. More preferably, the pressure ratio is 3000 or less, and particularly preferably 1000 or less, from the standpoint of forming an even narrower and more highly ionized arc region.

Next, a preferred configuration of the welding apparatus 10 for forming a narrow and highly ionized arc region will be further described below.

First, the ratio of the area of the opening 14a to the cross-sectional area of the portion of the arc region 13 passing through the opening 14a is preferably not less than 1 but not greater than 35. By controlling the area ratio to within this range, the first shielding gas can be made to flow to the same side as the first electrode through the space between the opening and the arc region, while applying pressure around the circumference of the arc region and without damaging the arc region; this serves to further stabilize the shape of the narrow and highly ionized arc region.

The flow rate of the first shielding gas passing through the opening 14a is preferably not less than 5 liters per minute but not larger than 35 liters per minute. By controlling the flow rate of the first shielding gas to within this range, the first shielding gas can be made to flow to the same side as the first electrode through the space between the opening and the arc region, while applying pressure around the circumference of the arc region and without damaging the arc region; this serves to further stabilize the shape of the narrow and highly ionized arc region.

Further, the ratio of spacing between the nozzle plate 14 and the base material 20 to the diameter of the opening 14a is not less than 1 but not larger than 20. By controlling the length ratio to within this range, the first shielding gas can be made to flow to the same side as the first electrode through the space between the opening and the arc region, while applying pressure around the circumference of the arc region and without damaging the arc region; this serves to further stabilize the shape of the narrow and highly ionized arc region. More specifically, the diameter (d) of the opening 14a is preferably 5 mm or less, and the spacing between the nozzle plate 14 and the base material 20 is preferably 2 mm or less.

FIG. 8B is a diagram (part 2) showing the relationship between the pressure ratio and the aspect ratio. Each filled circle plotted in FIG. 8B is for the case where the spacing (h) between the nozzle plate 14 and the base material 20 is 0.3 mm, and each unfilled square plotted in FIG. 8 is for the case where the spacing (h) between the nozzle plate 14 and the base material 20 is 0.6 mm.

The aspect ratio shown in FIG. 8B was obtained as the ratio of the melt depth to the welding width by measuring the melt depth and the welding width of the weld zone when the base material was arc-welded using the welding apparatus shown in FIGS. 2A and 3A. The arc welding conditions were as follows: the welding current was 40 A, the flow rate of the shielding gas was 10 to 20 liters per minute, the spacing between the first electrode and the base material was 1 mm, the diameter of the opening was 3 mm, the material used to form the first electrode was cerium-containing tungsten, and the material used as the base material was stainless steel.

As can be seen from FIG. 8B, when the diameter (d) of the opening 14a is held constant, a higher aspect ratio can be obtained by reducing the spacing (h) between the nozzle plate 14 and the base material 20. This is presumably because reducing the spacing (h) between the nozzle plate 14 and the base material 20 contributes to the stable formation of the narrow and highly ionized arc region. It can also be seen that the aspect ratio increases as the pressure ratio increases.

According to the welding apparatus 10 of the present embodiment described above, since the base material-side portion of the arc region is compressed around its circumference by the flowing pressure of the first shielding gas, a highly ionized and narrow arc region is formed. Then, by melting the base material utilizing this highly ionized and narrow arc region, a weld zone having a high aspect ratio is formed. Furthermore, since the pressure ratio can be controlled to within the above-described range by adjusting the flow rate of the first shielding gas or by suitably designing the nozzle diameter and nozzle height, the welding apparatus can be manufactured at low cost.

Next, second and third embodiments of the above-described welding apparatus will be described below with reference to FIGS. 9 to 14. In all aspects not specifically described otherwise, the detailed description given of the foregoing first embodiment essentially applies to the second and third embodiments. Further, the same component elements are designated by the same reference numerals.

Figure 9:
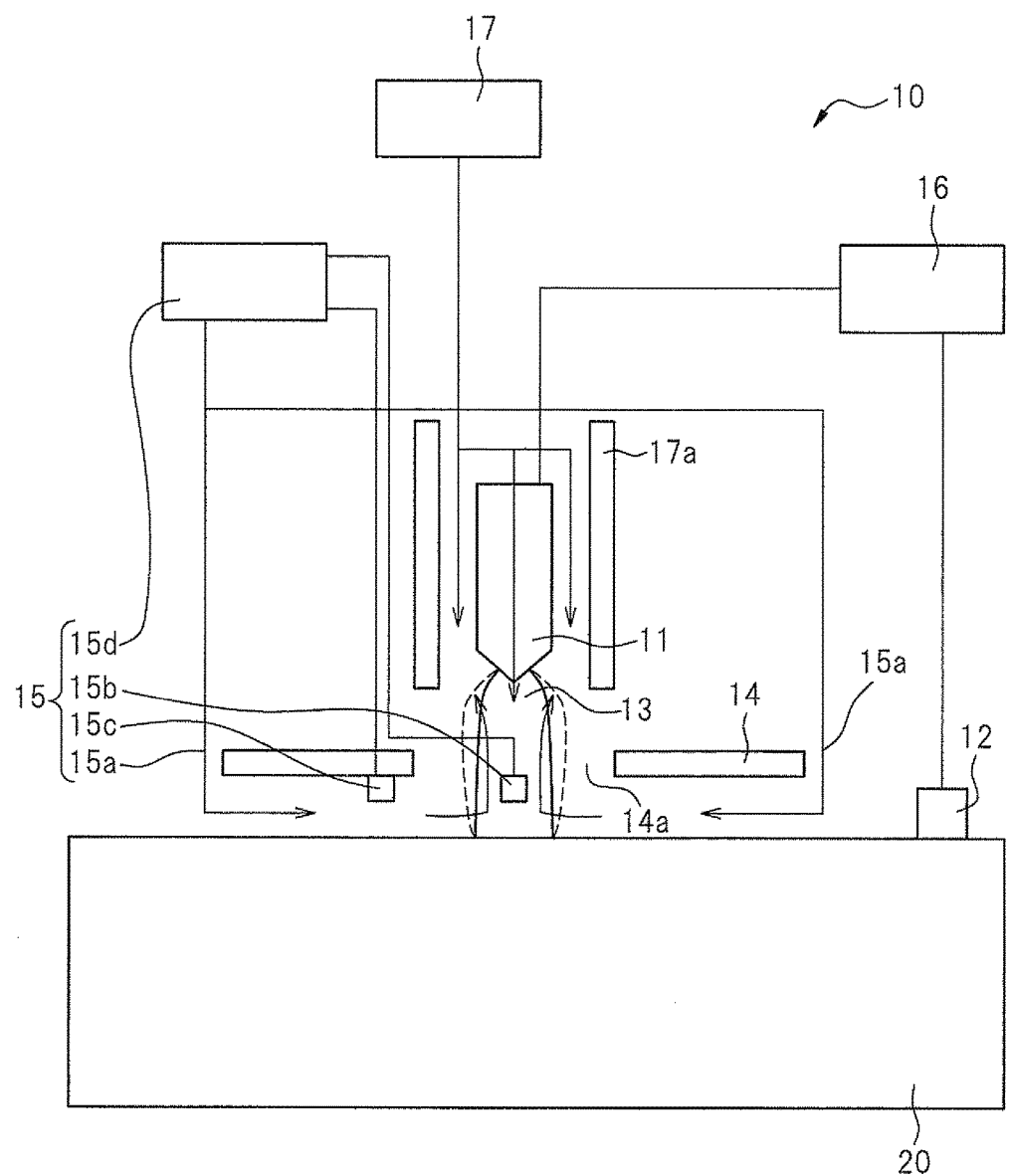
FIG. 9 is a diagram showing a second embodiment of the welding apparatus disclosed in this specification.

FIG. 9 is a diagram showing the second embodiment of the welding apparatus disclosed in this specification.

The welding apparatus according to this embodiment includes a second gas supply unit 17 which supplies a second shielding gas from the same side as the first electrode 11 toward the opening 13. The second gas supply unit 17 includes a second gas supply pipe 17a which supplies the second shielding gas along the first electrode 11.

The rod-like first electrode 11 is disposed inside the second gas supply pipe 17a, and the second shielding gas is supplied so as to flow along the outer circumference of the first electrode 11 into the opening 14a.

Furthermore, a passage for flowing the second shielding gas is formed passing through the center of the first electrode 11. The second gas supply unit 17 supplies the second shielding gas by passing it through the interior of the first electrode 11.

Next, the relationship between the first shielding gas and the second shielding gas for further reducing the width and enhancing the degree of ionization will be described below.

As a first concept, it is preferable that the ionization voltage of the second shielding gas is lower than the ionization voltage of the first shielding gas. By supplying the readily ionizable second shielding gas through the second gas supply pipe 17a, the ionized state of the second shielding gas is quickly formed in the arc region 13. On the other hand, by supplying the difficult-to-ionize first shielding gas through the first gas supply pipe 15a, the arc region is compressed around its circumference by the flowing pressure of the first shielding gas. Since the ionization voltage of the first shielding gas is higher, and the first shielding gas is thus difficult to ionize, the arc region 13 is prevented from spreading in the widthwise direction.

In FIG. 9, the arc region formed by the welding apparatus of the first embodiment is indicated by dashed lines, while the arc region formed by the welding apparatus of the second embodiment is indicated by solid lines.

FIG. 10 is a diagram showing the densities and ionization voltages of the gases that may be used by the welding apparatus 10. The densities shown in FIG. 10 are obtained when the temperature is 300 K (normal temperature).

When applying the first concept described above, Ar whose ionization voltage is low, for example, can be used as the second shielding gas, and He whose ionization voltage is high can be used as the first shielding gas.

As a second concept, it is preferable that the density of the first shielding gas is higher than the density of the second shielding gas. By supplying the higher density first shielding gas through the first gas supply pipe 15a, the arc region can be fully compressed around its circumference by the flowing pressure of the first shielding gas. On the other hand, by supplying the lower density second shielding gas through the center of the second gas supply pipe 17a, the shielding gas can be supplied without spreading the arc region 13 in the widthwise direction. When applying the second concept, it is preferable to supply the second shielding gas only through the center of the second gas supply pipe 17a. A $CO_2$ gas, an $N_2$ gas, an Ar gas, or gas mixtures such as Ar+$H_2$ and Ar+He may be used.

According to the welding apparatus 10 of the present embodiment described above, the degree of ionization can be further enhanced while further reducing the width of the arc region.

Figure 11:
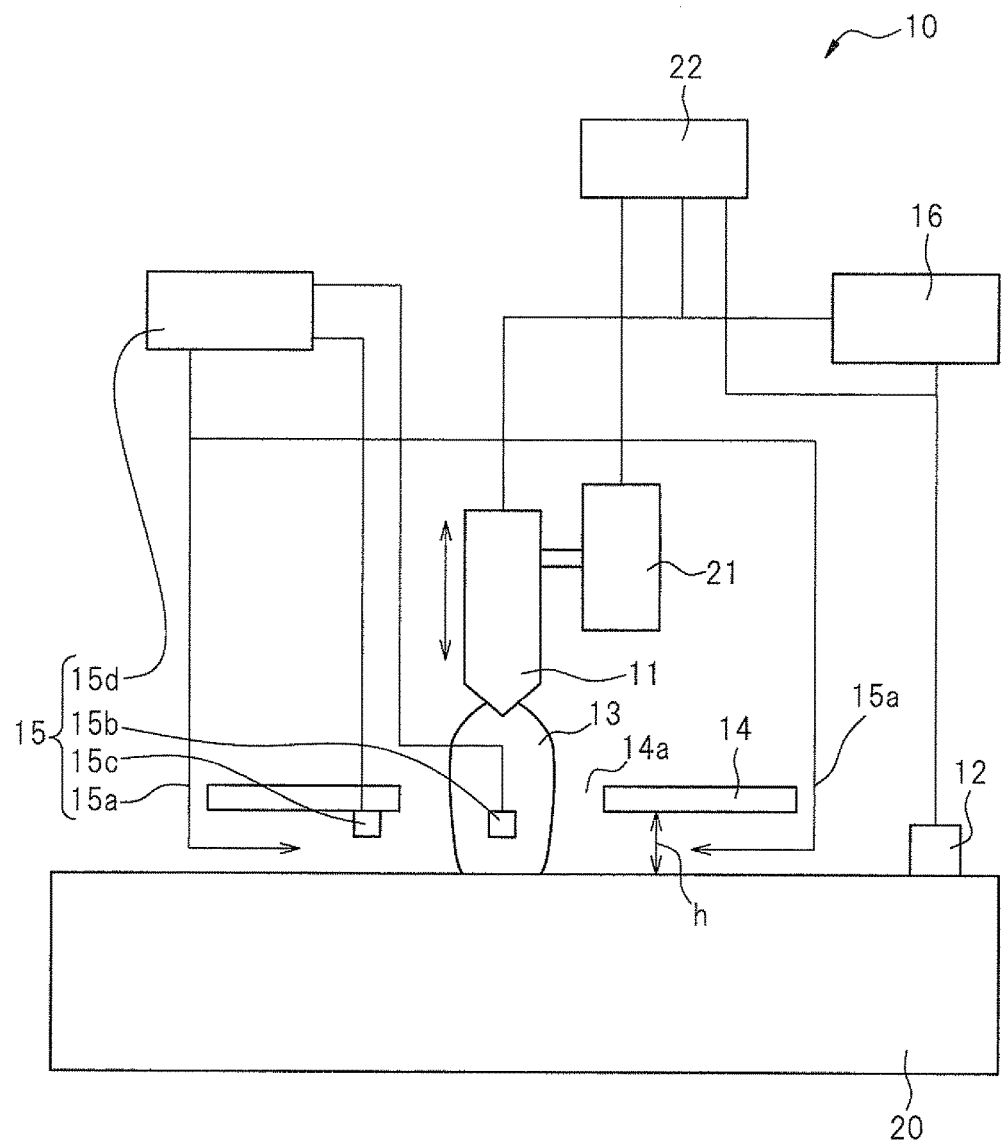
FIG. 11 is a diagram showing a third embodiment of the welding apparatus disclosed in this specification.

FIG. 11 is a diagram showing the third embodiment of the welding apparatus disclosed in this specification.

The welding apparatus according to this embodiment further enhances the energy density of the melt zone.

The density of the energy applied to the melt zone is obtained by the following equation.

Energy Density=Amount of Heat Input (Current× Voltage)/Area of Heat Input

Here, the current represents the current that flows between the first electrode 11 and the second electrode 12, and the voltage represents the voltage applied between the first electrode 11 and the second electrode 12. The area of heat input refers to the area of that portion of the base material 20 on which the arc region is formed.

In the earlier described embodiments, the density of the energy applied to the melt zone has been enhanced by reducing the area of heat input.

The present embodiment is interested to further enhance the energy density of the melt zone by not only reducing the area of heat input, but at the same time, increasing the amount of heat input by increasing the voltage.

As shown in FIG. 11, the welding apparatus 10 includes a driving unit 21 which drives the first electrode 11 in such a way as to vary the spacing between the first electrode 11 and the base material 20, and a driving control unit 22 which controls the driving unit 21. The driving unit 21 moves the first electrode 11 up and down to vary the spacing between the first electrode 11 and the base material 20. On the other hand, the driving control unit 22 measures the voltage applied between the first electrode 11 and the second electrode 12, and controls the driving unit 21 based on the measured voltage.

As the spacing between the first electrode 11 and the base material 20 varies, the arc length of the arc region 13 also varies. Further, as the arc length of the arc region 13 varies, the resistance of the arc region 13 also varies. More specifically, the resistance of the arc region 13 increases with increasing arc length and decreases with decreasing arc length.

On the other hand, from the standpoint of achieving stable arc welding, it is preferable that the current flowing between the first electrode 11 and the second electrode 12 is maintained constant.

The welding power supply 16 maintains the current flowing between the first electrode 11 and the second electrode 12 at a constant level by varying the voltage applied between the first electrode 11 and the second electrode 12 as the arc length, and hence the resistance of the arc region 13, varies.

First, after the arc region 13 has been formed, the welding apparatus 10, while expanding the arc length, increases the voltage applied between the first electrode 11 and the second electrode 12 so that the current flowing between the first electrode 11 and the second electrode 12 is maintained constant. The arc length is expanded until the voltage applied between the first electrode 11 and the second electrode 12 exceeds a predetermined threshold value. Then, after the voltage has reached a level that provides the amount of heat input necessary to achieve the desired energy density, the welding of the base material 20 is further continued while rotating the base material 20. The operation of the welding apparatus 10 will be described below with reference to FIG. 12.

Figure 12:
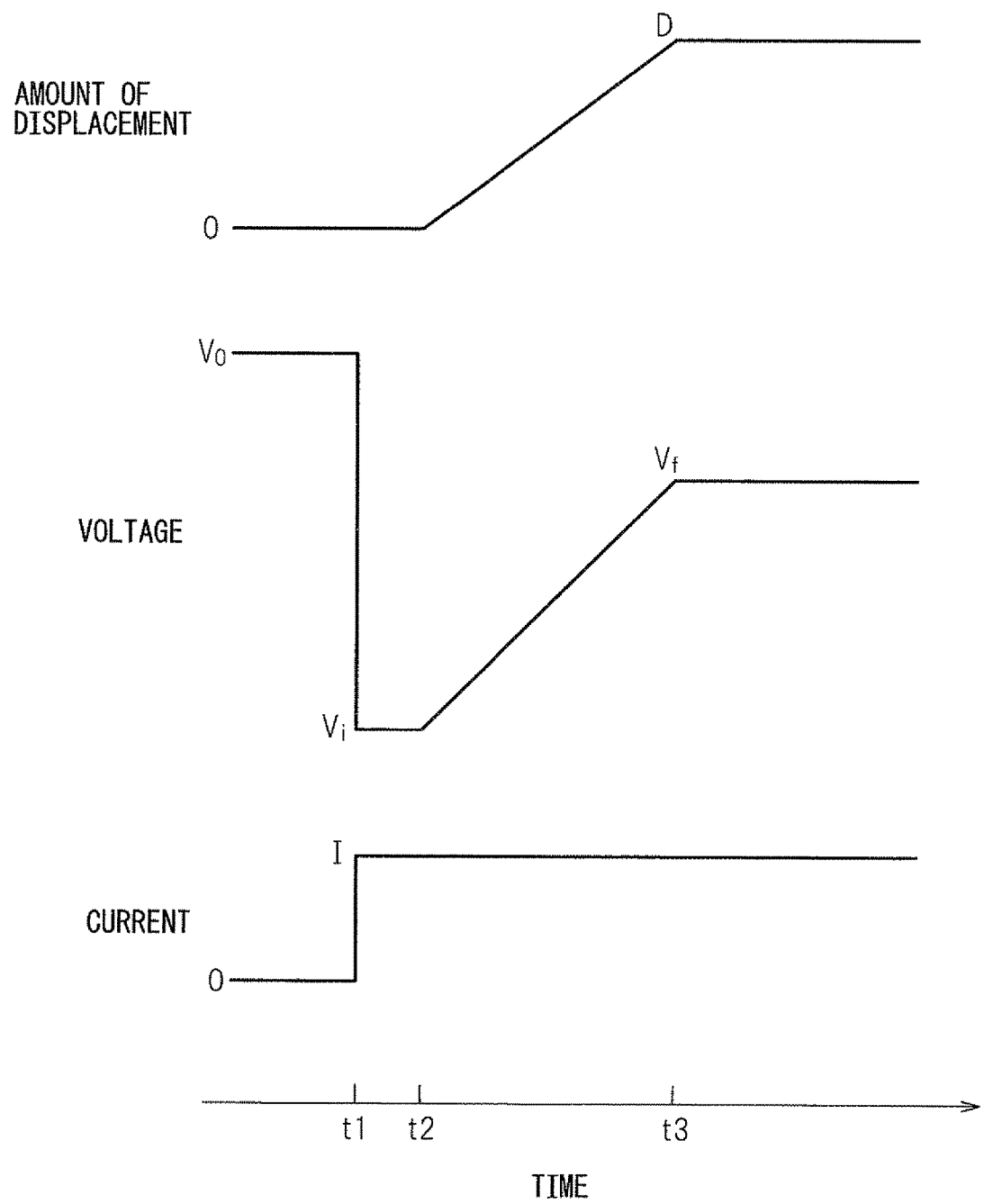
FIG. 12 is a diagram for explaining the amount of displacement of first electrode in relative relationship to voltage and current.
Figure 13:
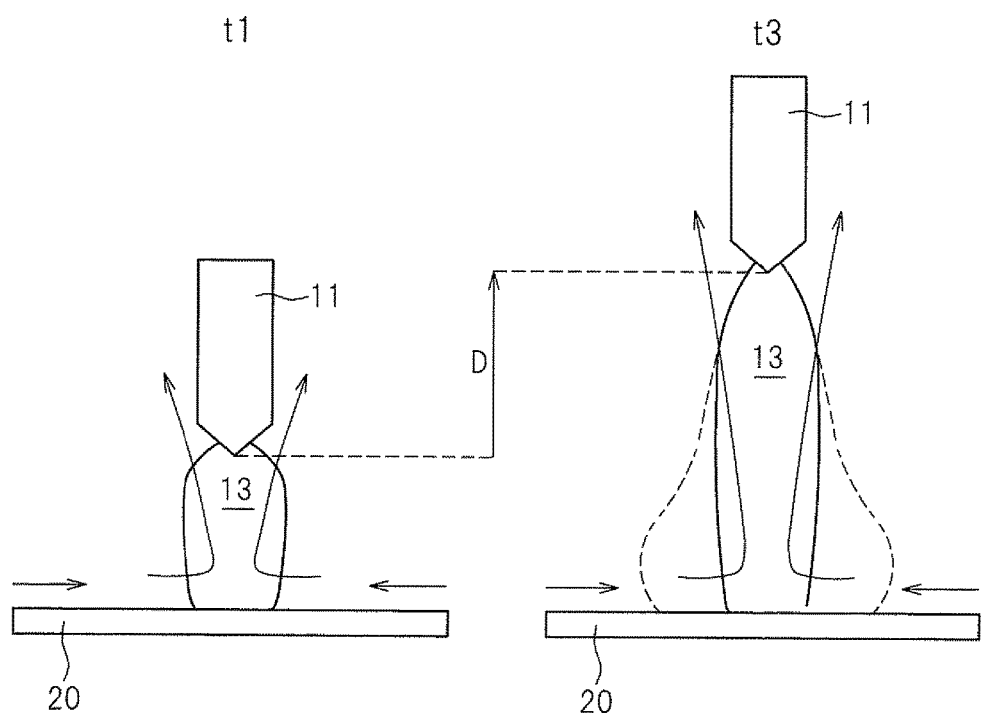
FIG. 13 is a diagram showing the arc region at time t1 and time t3 in FIG. 12.

FIG. 12 is a diagram for explaining the amount of displacement of the first electrode in relative relationship to the voltage and current. FIG. 13 is a diagram showing the arc region at time t1 and time t3 in FIG. 12.

In FIG. 12, the amount of upward displacement of the first electrode 11, the voltage applied between the first electrode 11 and the second electrode 12, and the current flowing between the first electrode 11 and the second electrode 12 are plotted as a function of time.

First, at time t1, the arc region 13 is formed by supplying the first shielding gas. The amount of displacement of the first electrode 11 at time t1 is zero. When the arc region 13 is formed, the voltage applied between the first electrode 11 and the second electrode 12 drops from $V_0$ to $V_i$, while the current increases from zero to I. When first forming the arc region 13, the first electrode 11 need only be spaced apart from the base material 20 by a distance just sufficient so that the arc region 13 can be formed by applying the voltage $V_0$. If the first electrode 11 is spaced too far apart from the base material 20, the arc region 13 cannot be formed. Then, during the period from time t1 to time t2, the amount of displacement is held constant to stabilize the arc region 13.

Next, at time t2, the driving control unit 22 controls the driving unit 21 to expand the spacing between the first electrode 11 and the base material 20. The amount of displacement begins to increase with the first electrode 11 moving upward away from the base material 20. The welding power supply 16 begins to increase the voltage applied between the first electrode 11 and the second electrode 12 so that the current flowing between the first electrode 11 and the base material 20 is maintained constant. While the voltage increases, the current is held constant at I, as shown in FIG. 12.

Next, at time t3, when the voltage applied between the first electrode 11 and the second electrode 12 exceeds a predetermined threshold value $V_f$, the driving control unit 22 controls the driving unit 21 so that the driving of the first electrode 11 is stopped. By this time, the amount of displacement of the first electrode 11 has reached D, which means that the arc length of the arc region 13 has been expanded by an amount equal to the amount of displacement, D, compared with the initial length.

In this way, the desired amount of heat input can be obtained when the voltage between the first electrode 11 and the second electrode 12 reaches the predetermined threshold value $V_f$. Then, while applying the voltage $V_f$ between the first electrode 11 and the second electrode 12, the welding apparatus 10 continues to perform the arc welding by rotating the base material 20.

After the arc region 13 has been formed at time t1, the base material 20 continues to be held at rest during the period from time t1 to time t3, but the welding apparatus 10 is performing the arc welding of the base material 20 during this period.

Next, referring to FIG. 13, a description will be given of how the welding apparatus 10 prevents the energy density from decreasing by preventing the area of heat input from increasing when expanding the arc length.

First at time t1, when the amount of displacement of the first electrode 11 is zero, the arc region 13 is formed.

In the welding apparatus 10 of the present embodiment, as in the first embodiment, the first shielding gas is introduced from the circumference of the base material-side portion of the arc region 13 toward the center of the arc region 13 during the period from time t1 to time t2.

If the first shielding gas is not introduced here, the area of heat input will increase as the arc length increases. In FIG. 13, the shape of the arc region at time t3 when the first shielding gas was not introduced is indicated by dashed lines.

In the welding apparatus 10, since the first shielding gas is introduced from the circumference of the base material-side portion of the arc region 13 toward the center of the arc region 13, the arc region 13 is prevented from expanding widthwise, and thus the area of heat input is prevented from increasing. This serves to prevent the increase in the energy density from being defeated by the increase in the area of heat input.

In view of the above, it is preferable to increase the ratio of the pressure outside the arc region to the pressure at the center of the arc region 13 as the arc length increases, and thereby to prevent the arc region 13 from expanding widthwise. More specifically, it is preferable to increase the flow rate of the first shielding gas as the arc length increases.

According to the welding apparatus 10 of the embodiment described above, the energy density of the melt zone is further enhanced by not only reducing the area of heat input, but at the same time, increasing the amount of heat input by increasing the voltage.

In the present invention, the welding method of each of the above embodiments and the welding apparatus using such a welding method can be modified as needed without departing from the spirit and purpose of the present invention. Further, the constituent features of one embodiment can be applied to the other embodiment where appropriate.

Figure 14:
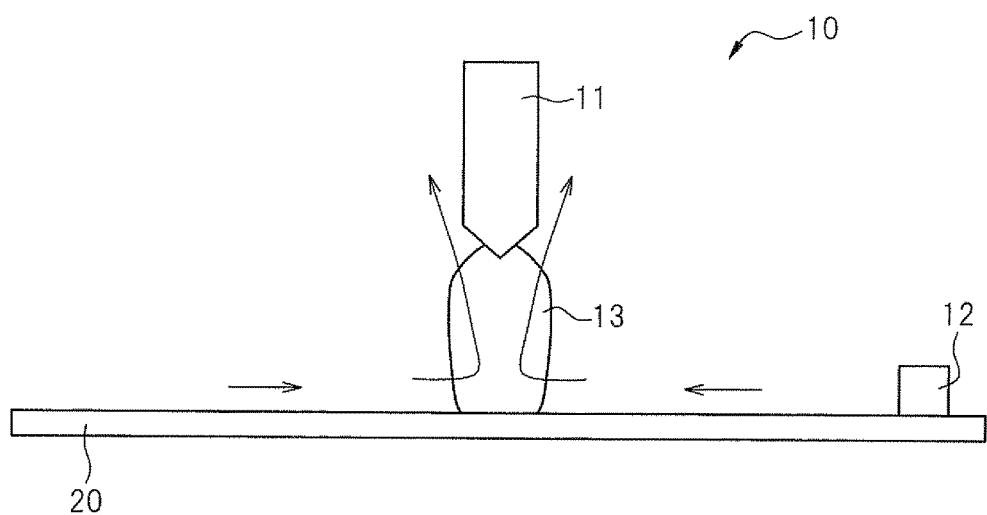
FIG. 14 is a diagram showing another example of the welding apparatus disclosed in this specification.

For example, the welding apparatus 10 disclosed in this specification need only comprise, as illustrated in FIG. 14, the first electrode 11, the second electrode 12, and the first gas supply unit which supplies the first shielding gas toward the center of the arc region 13 from the circumference of the base material-side portion of the arc region 13 formed between the first electrode 11 and the base material 20 connected to the second electrode 12, and controls the ratio of the pressure outside the arc region to the pressure at the center of the arc region 13 to within the range of 70 to 5000, and the other component elements may be different from those of the respective embodiments described above.

Figure 15:
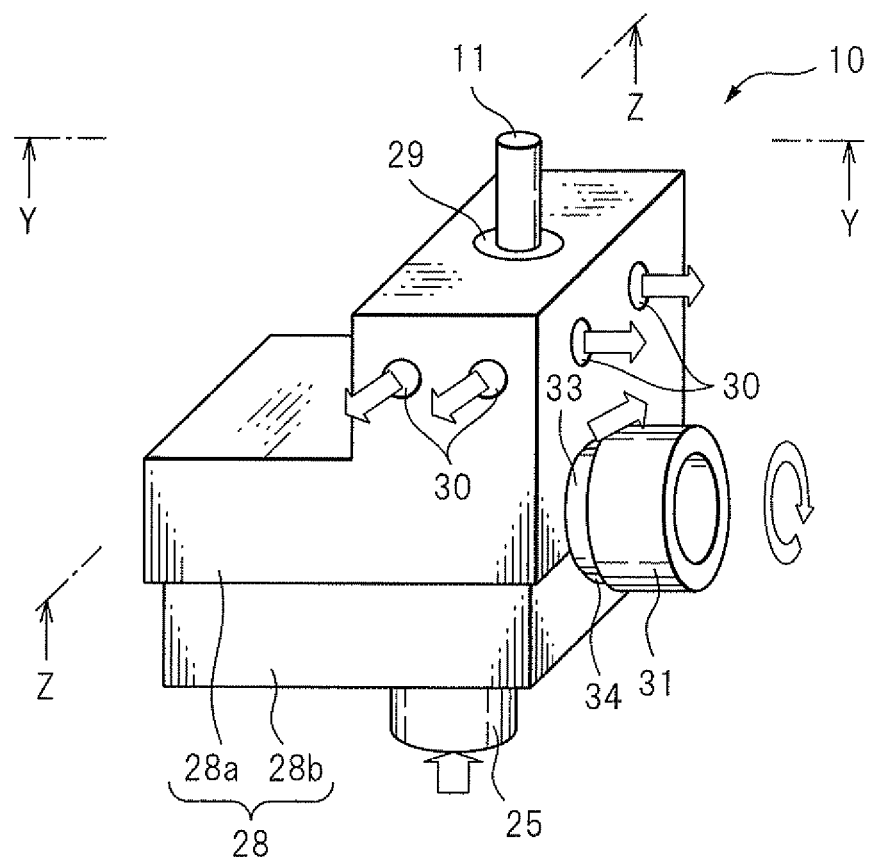
FIG. 15 is a diagram showing still another example of the welding apparatus disclosed in this specification.
Figure 16:
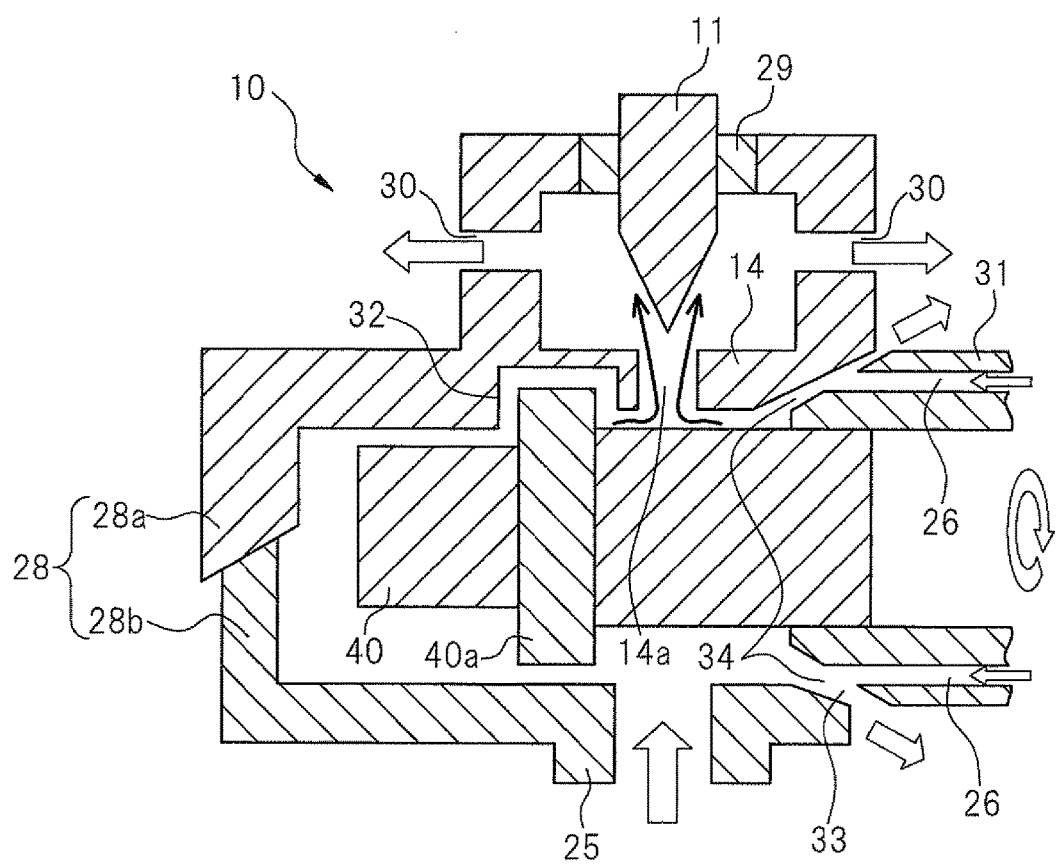
FIG. 16 is a diagram showing a cross section taken along line Y-Y in FIG. 15.
Figure 17:
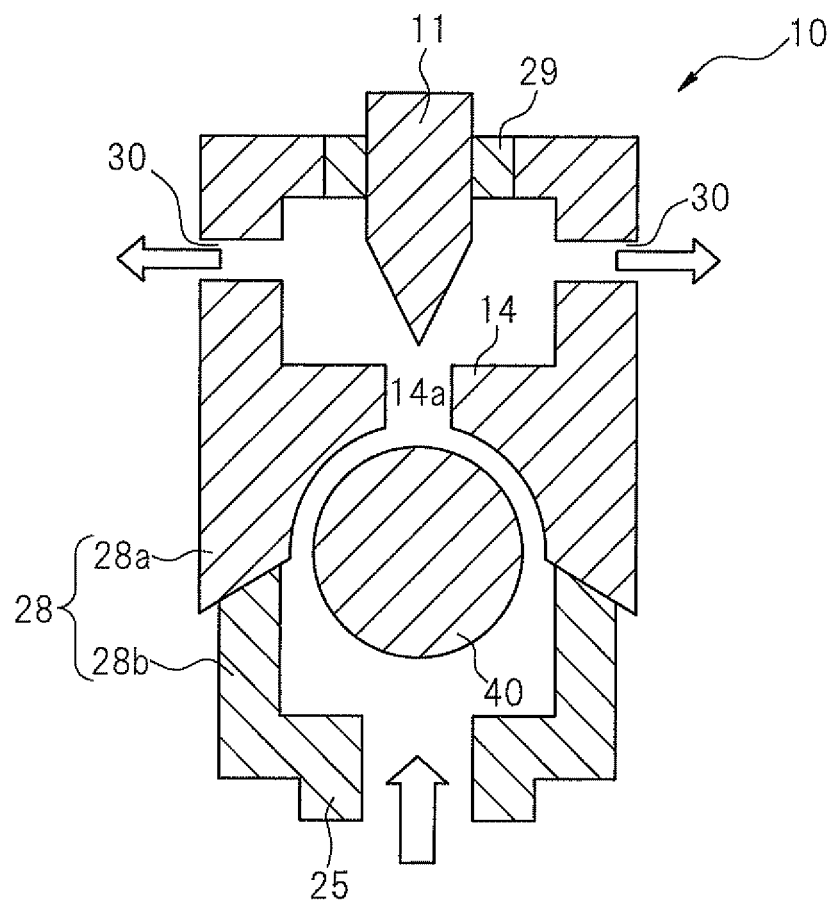
FIG. 17 is a diagram showing a cross section taken along line Z-Z in FIG. 15.

Further, the welding apparatus 10 disclosed in this specification may include a casing 28 of a shape such as shown in FIGS. 15 to 17.

FIG. 15 is a diagram showing of another example of the welding apparatus disclosed in this specification. FIG. 16 is a diagram showing a cross section taken along line Y-Y in FIG. 15. FIG. 17 is a diagram showing a cross section taken along line Z-Z in FIG. 15.

The casing 28 is made up of an upper casing 28a, in which the first electrode 11 and the nozzle plate 14 are disposed, and a lower casing 28b. The base material 40 is rotatably held in the space formed between the upper casing 28a and the lower casing 28b.

The shape of the base material is not necessarily limited to a simple cylindrical shape such as shown in FIG. 2. In the example shown in FIG. 15, the base material 40 has a protruding portion 40a protruding from its cylindrically shaped body.

The upper housing 28a has a recessed portion 32 whose recessed shape matches the protruding shape of the protruding portion 40a of the base material 40. The base material 40 rotates with its protruding portion 40a held inside the recessed portion 32.

The first electrode 11 is fixedly secured to the upper casing 28a by interposing therebetween an electrically insulating member 29.

The nozzle plate 14 with its nozzle opening 14a formed therein is disposed between the first electrode 11 and the base material 40. The first electrode 11 is located right above the center of the nozzle opening 14a. The nozzle plate 14 may be formed integrally with the casing 28.

The first gas supply pipe 15a is connected to the lower casing 29b. The first shielding gas introduced through the first gas supply pipe 15a into the casing 28 passes between the casing 28 and the base material 40 and flows into the space created on the base material side of the nozzle plate 14. Further, the first shielding gas flows from the base material side of the nozzle plate 14 into the space created on the first electrode 11 side by passing through the nozzle opening 14a. The first shielding gas fed into the space on the first electrode 11 side is exhausted to the outside through an exhaust outlet 30.

The base material 40 is connected to an externally located base-material rotating unit not shown by means of a base-material holding device 31. The base-material rotating unit rotates the base material 40 by rotating the base-material holding device 31.

The base-material holding device 31 with the base material 40 fixedly held thereon is inserted into the opening 33 of the casing 28. A gap 34 is provided between the base-material holding device 31 and the casing 28. This gap 34 is provided in order to prevent the rotating base-material holding device 31 from contacting the casing 28.

The upper and lower casings 28a and 28b are joined together by butting their tapered ends against each other, forming a closed space except where the opening 33 of the casing 28 is formed.

The first shielding gas introduced through the first gas supply pipe 15a into the casing 28 is allowed to flow to the outside through the gap 34.

A third gas supply pipe 26 for supplying a third gas is formed inside the base-material holding device 31, and the third gas is supplied toward the gap 34 through the third gas supply pipe 26. The third gas supplied to the gap 34 flows from the outside toward the inside of the casing 28.

As a result, the first shielding gas flowing from the inside toward the outside of the casing 28 and the third gas flowing from the outside toward the inside of the casing 28 run against each other in the gap 34, thus preventing the first shielding gas from flowing from the inside toward the outside of the casing 28.

Preferably, the same gas as the first shielding gas is used as the third gas. Also preferably, the flow rate of the third gas is set equal to the flow rate of the first shielding gas flowing from the inside toward the outside of the casing 28 through the gap 34.

In FIGS. 15 to 17, some of the component elements, such as the arc region, sensors, etc., are not shown.

As described above, the casing 28 is provided with the opening 33 in which the base material 40 is rotatably inserted, and the gap 34 is provided in the opening 33 between the casing 28 and the base material 40 or the base-material holding device 31; preferably, in the gap 34, the first shielding gas is flowing from the inside toward the outside of the casing 28, and the third gas is flowing from the outside toward the inside of the casing 28.

According to the welding apparatus 10 shown in FIGS. 15 to 17, by causing the third gas to flow along the sliding portion, the first shielding gas can be reliably prevented from flowing to the outside of the casing 28.

EXAMPLES

Next, the welding apparatus disclosed in this specification will be described below with reference to examples. However, the scope of the present invention is not limited by the specific examples described herein.

Working Example

As a working example, arc welding was performed using the welding apparatus shown in FIGS. 2A and 3A. The arc welding conditions were as follows: the welding current was 50 A, the flow rate of the shielding gas was 25 liters per minute, the spacing between the first electrode and the base material was 1 mm, the diameter of the opening was 3 mm, the material used to form the first electrode was cerium-containing tungsten, and the material used as the base material was stainless steel.

The pressure ratio in the working example was 100.

Figure 1:
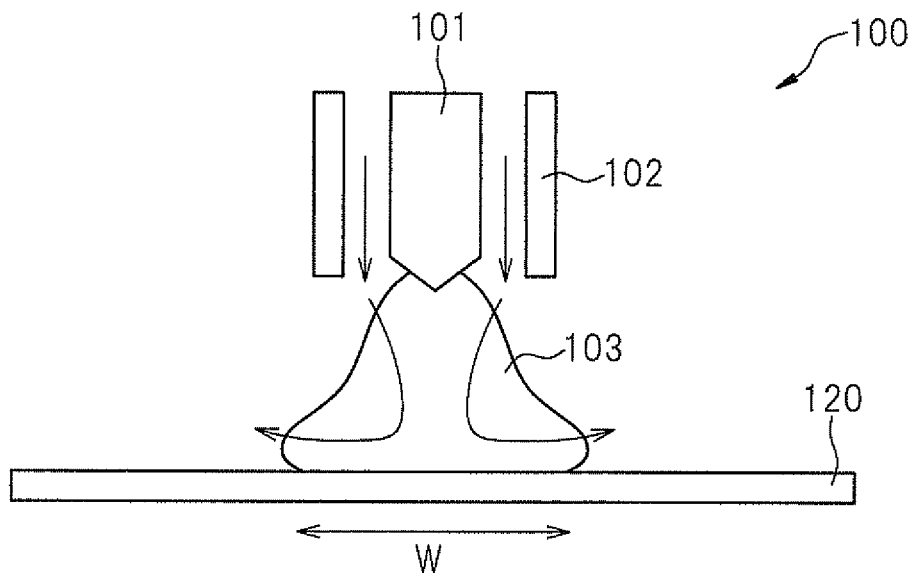
FIG. 1 is a diagram showing an arc welding apparatus according to the related art.

As a comparative example, arc welding was performed using the welding apparatus shown in FIG. 1. The arc welding conditions were as follows: the welding current was 50 A, the flow rate of the shielding gas was 25 liters per minute, the spacing between the electrode and the base material was 1 mm, the material used to form the first electrode was cerium-containing tungsten, and the material used as the base material was stainless steel.

The pressure ratio in the comparative example was 1.

FIG. 18 shows the weld zone dimensions and aspect ratios measured on the working example and the comparative example, respectively.

The weld zone width of the working example was 32% smaller than that of the comparative example, and the melt depth was 58% greater. Further, the aspect ratio of the weld zone of the working example was 2.3 times that of the comparative example.

The energy density in the working example was 1000 W/mm$^2$, and the energy density in the working example was 100 W/mm$^2$.

The invention claimed is:

1. A welding method for performing arc welding, the method comprising:
    forming an arc region between a first electrode and a base material connected to a second electrode;
    supplying a first shielding gas from a circumference of a base material-side portion of the arc region toward a center of the arc region along a surface of the base material such that the first shielding gas flows between the base material and a nozzle plate having an opening through which the arc region passes and is drawn to the same side as the first electrode, contacting with the surface of the nozzle plate; and
    controlling the ratio of pressure outside the arc region to pressure at the center of the arc region on the base material-side of the nozzle plate to within the range of 70 to 5000,
    wherein the nozzle plate has a flat portion which is parallel to the surface of the base material that is directly below the flat portion and the opening is arranged in the flat portion.

2. The welding method as claimed in claim 1, wherein the ratio of an area of the opening to a cross-sectional area of a portion of the arc region that passes through the opening is in the range of 1 to 35.

3. The welding method as claimed in claim 1, wherein a flow rate of the first shielding gas that flows through the opening is in the range of 5 liters per minute to 35 liters per minute.

4. The welding method as claimed in claim 1, wherein the opening is circular in shape, and the ratio of spacing between the nozzle plate and the base material to the diameter of the opening is in the range of 1 to 20.

5. The welding method as claimed in claim 1, further comprising supplying a second shielding gas from a first electrode-side portion of the arc region.

6. The welding method as claimed in claim 5, wherein an ionization voltage of the second shielding gas is lower than an ionization voltage of the first shielding gas.

7. The welding method as claimed in claim 5, wherein the first shielding gas has a higher density than the second shielding gas.

8. The welding method as claimed in claim 1, further comprising controlling a spacing between the first electrode and the base material to expand the spacing and increase a voltage applied between the first electrode and the second electrode so that a current flowing between the first electrode and the second electrode is maintained constant.

9. The welding method as claimed in claim 8, further comprising controlling the expansion of the spacing between the first electrode and the base material to stop the expansion when the voltage applied between the first electrode and the second electrode exceeds a predetermined threshold value.

10. The welding method as claimed in claim 1, wherein the supplying and controlling are performed simultaneously.

11. The welding method as claimed in claim 1, wherein the space between the base material and the nozzle plate defines a channel through which the first shielding gas is supplied from the circumference of the base material-side portion of the arc region toward the center of the arc region.

12. The welding method as claimed in claim 1, wherein the nozzle plate is arranged to be closer to the base material than the first electrode and the pressure outside of the arc region is measured at the peripheral portion of the opening.

13. The welding method as claimed in claim 1, wherein the nozzle plate is arranged to be parallel to the surface of the base material.

14. The welding method as claimed in claim 1, wherein the length of the flat portion is larger than a welding width.

15. The welding method as claimed in claim 1, wherein the first shielding gas is supplied from outside of the flat portion relative to the center of the arc region.

16. The welding method as claimed in claim 1, wherein an electrically insulating member is arranged, outside of the flat portion relative to the center of the arc region, on the base material, and
    the first shielding gas is supplied from above the electrically insulating member.

17. A welding apparatus comprising:
    a first electrode;
    a second electrode;
    a nozzle plate; and
    a first gas supply unit configured to supply a first shielding gas from a circumference of a base material-side portion of an arc region formed between the first electrode and a base material connected to the second electrode toward a center of the arc region along a surface of the base material such that the first shielding gas flows between the base material and the nozzle plate having an opening through which the arc region passes and is drawn to the same side as the first electrode, contacting with the surface of the nozzle plate, and to control a ratio of pressure outside the arc region to pressure at a center of the arc region on a base material-side of the nozzle plate to within the range of 70 to 5000,
wherein the nozzle plate has a flat portion which is parallel to the surface of the base material that is directly below the flat portion and the opening is arranged in the flat portion.

18. The welding apparatus as claimed in claim 17, wherein the nozzle plate has an opening through which the arc region formed between the first electrode and the base material connected to the second electrode passes.

19. The welding apparatus as claimed in claim 18, wherein the first gas supply unit includes:
a first gas supply pipe configured to supply the first shielding gas to the base material-side of the nozzle plate;
a first pressure sensor configured to measure the pressure at the center of the arc region on the base material-side of the nozzle plate;
a second pressure sensor configured to measure the pressure outside the arc region on the base material-side of the nozzle plate; and
a control unit configured to input measured values from the first and second pressure sensors and to control the amount of the first shielding gas to be supplied through the first gas supply pipe so that the ratio of the pressure outside the arc region to the pressure at the center of the arc region on the base material-side of the nozzle plate is maintained within the range of 70 to 5000.

20. The welding apparatus as claimed in claim 17, further comprising a second gas supply unit configured to supply a second shielding gas from a first electrode-side portion of the arc region.

21. The welding apparatus as claimed in claim 17, further comprising:
a driving unit configured to drive the first electrode so as to vary a spacing between the first electrode and the base material;
a driving control unit configured to control the driving unit; and
a power supply configured to supply a constant current between the first electrode and the second electrode, wherein
the driving control unit is configured to control the driving unit to expand the spacing between the first electrode and the base material, and
the power supply is configured to increase the voltage applied between the first electrode and the second electrode so that a current flowing between the first electrode and the base material is maintained constant.

22. The welding apparatus as claimed in claim 21, wherein the driving control unit is configured to control the driving unit to stop driving said first electrode when the voltage applied between the first electrode and the second electrode exceeds a predetermined threshold value.

* * * * *